(12) United States Patent
Lee et al.

(10) Patent No.: US 12,096,273 B2
(45) Date of Patent: Sep. 17, 2024

(54) SDAP CONFIGURATION FOR DESTINATION IN SIDELINK COMMUNICATION

(71) Applicant: LG ELECTRONICS INC., Seoul (KR)

(72) Inventors: Youngdae Lee, Seoul (KR); Laeyoung Kim, Seoul (KR); Heejeong Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 17/607,360

(22) PCT Filed: Apr. 28, 2020

(86) PCT No.: PCT/KR2020/005612
§ 371 (c)(1),
(2) Date: Oct. 28, 2021

(87) PCT Pub. No.: WO2020/222507
PCT Pub. Date: Nov. 5, 2020

(65) Prior Publication Data
US 2022/0225156 A1    Jul. 14, 2022

(30) Foreign Application Priority Data

May 1, 2019  (KR) .................. 10-2019-0051124
May 1, 2019  (KR) .................. 10-2019-0051126
May 1, 2019  (KR) .................. 10-2019-0051134

(51) Int. Cl.
*H04W 28/02*  (2009.01)
*H04W 92/18*  (2009.01)

(52) U.S. Cl.
CPC ... *H04W 28/0273* (2013.01); *H04W 28/0263* (2013.01); *H04W 28/0268* (2013.01); *H04W 92/18* (2013.01)

(58) Field of Classification Search
CPC ......... H04W 28/0273; H04W 28/0263; H04W 28/0268; H04W 92/18; H04W 28/24;
(Continued)

(56) References Cited

U.S. PATENT DOCUMENTS

| | | | |
|---|---|---|---|
| 2019/0239112 A1* | 8/2019 | Rao ........................... | H04L 1/08 |
| 2020/0163005 A1* | 5/2020 | Rao ........................ | H04W 4/40 |
| 2020/0296619 A1* | 9/2020 | Pan ........................ | H04W 76/14 |
| 2020/0314959 A1* | 10/2020 | Agiwal .................. | H04W 76/14 |
| 2021/0297905 A1* | 9/2021 | Zhang ................... | H04W 76/27 |

(Continued)

FOREIGN PATENT DOCUMENTS

WO    2017/030400 A1    2/2017

OTHER PUBLICATIONS

Catt, "SDAP Open Issues", R2-1903175, 3GPP TSG-RAN WG2 Meeting #105bis, Xi'an, China, Apr. 8-12, 2019, pp. 1-2.

(Continued)

*Primary Examiner* — Michael K Phillips
(74) *Attorney, Agent, or Firm* — BRYAN CAVE LEIGHTON PAISNER LLP

(57) ABSTRACT

A method and apparatus for service data adaptation protocol (SDAP) configuration for a destination in sidelink communication is provided. A wireless device establishes a service data adaptation protocol (SDAP) entity based on a SDAP configuration per destination of a sidelink communication. This can be achieved by the wireless device receiving a configuration of one or more sidelink radio bearers (SLRBs), which includes an SDAP configuration for each of the one or more SLRBs. Each SDAP configuration, in turn, includes a list of Quality of Service Flow Identities (QFIs) for a corresponding destination, from among one or more destinations, to be mapped to a corresponding SLRB. One or more transmitting SDAP entities can then be established for each of the one or more destinations.

12 Claims, 19 Drawing Sheets

Establish a SDAP entity based on a SDAP configuration per destination of a sidelink communication — S1300

Perform the sidelink communication via the SDAP entity — S1310

(58) Field of Classification Search
CPC ......... H04W 76/11; H04W 4/06; H04W 4/40; H04W 76/14; H04W 28/02
See application file for complete search history.

(56) References Cited

U.S. PATENT DOCUMENTS

| | | | |
|---|---|---|---|
| 2021/0329487 A1* | 10/2021 | Wang | H04W 28/24 |
| 2022/0022228 A1* | 1/2022 | Wang | H04W 4/46 |
| 2022/0132603 A1* | 4/2022 | Adjakple | H04W 8/005 |
| 2022/0150871 A1* | 5/2022 | Luo | H04L 1/1861 |
| 2022/0217575 A1* | 7/2022 | Wang | H04W 76/14 |

OTHER PUBLICATIONS

Intel Corporation, "Enhancements to UE assistance and UE sidelink information", R2-1903661, 3GPP TSG-RAN WG2 Meeting 105bis, Xi'an, China, Apr. 8-12, 2019, pp. 1-2.

Ericsson, "SDAP configuration aspects", R2-1712924, 3GPP TSG-RAN WG2 #100, Reno, Nevada, USA, Nov. 27-Dec. 1, 2017, pp. 1-3.

Qualcomm Incorporated et al., "Correction on SDAP reconfiguration handling", R2-1818908, 3GPP TSG-RAN WG2 Meeting #104, Spokane, WA, USA, Nov. 12-16, 2018, p. 2.

Ericsson, "No. of supported SDAP entities in the UE", R2-1800700, 3GPP TSG-RAN WG2 NR AH#1801, Vancouver, Canada, Jan. 22-26, 2018, pp. 2-3; table 1; and figure 1.

3GPP TS 37.324 V15.1.0, "3rd Generation Partnership Project; Technical Specification Group Radio Access Network; E-UTRA and NR; Service Data Adaptation Protocol (SDAP) specification (Release 15)", Sections 4 and 5, (Sep. 2018).

3GPP TS 23.287 V0.3.0, "3rd Generation Partnership Project; Technical Specification Group Services and System Aspects; Architecture enhancements for 5G System (5GS) to support Vehicle-to-Everything (V2X) services (Release 16)", Sections 5.2, 5.4 and 5.6, (Apr. 2019).

* cited by examiner

SDAP CONFIGURATION FOR DESTINATION IN SIDELINK COMMUNICATION

This application is the National Stage filing under 35 U.S.C. 371 of International Application No. PCT/KR2020/005612, filed on Apr. 28, 2020, which claims the benefit of and priority to Korean Patent Application No. 10-2019-0051134, filed on May 1, 2019, Korean Patent Application No. 10-2019-0051126, filed on May 1, 2019 and Korean Patent Application No. 10-2019-0051124, filed on May 1, 2019, the contents of which are all hereby incorporated by reference herein in their entirety.

TECHNICAL FIELD

The present disclosure relates to service data adaptation protocol (SDAP) configuration for a destination in sidelink communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Until Rel-15, broadcast transmission is supported only for V2X communication. In case of NR V2X, unicast and groupcast transmission may also be supported for V2X communication as well as broadcast transmission. Unicast transmission is expected to be used for high reliability and low latency cases, e.g., extended sensor sharing and remote driving, emergency, etc.

An aspect of the present disclosure is to provide a method and apparatus for SDAP configuration for destination, considering unicast sidelink communication between UEs.

In an aspect, a method for a wireless device in a wireless communication system is provided. The method includes establishing a service data adaptation protocol (SDAP) entity based on a SDAP configuration per destination of a sidelink communication.

In another aspect, a method for a wireless device in a wireless communication system is provided. The method includes receiving, from a first wireless device, a first radio resource control (RRC) message including a first service data adaptation protocol (SDAP) configuration, receiving, from a second wireless device, a second RRC message including a second SDAP configuration, establishing a first SDAP entity for a first unicast link with the first wireless device based on the first SDAP configuration, and establishing a second SDAP entity for a second unicast link with the second wireless device based on the second SDAP configuration.

In another aspect, an apparatus for implementing the above method is provided.

The present disclosure can have various advantageous effects.

For example, a UE can configure a SDAP entity for each destination, in particular when the UE performs sidelink communication with the other UE.

For example, the system can properly control mapping between QoS flows and sidelink radio bearers for a UE performing SL transmission and/or reception based on UE's indication to the network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
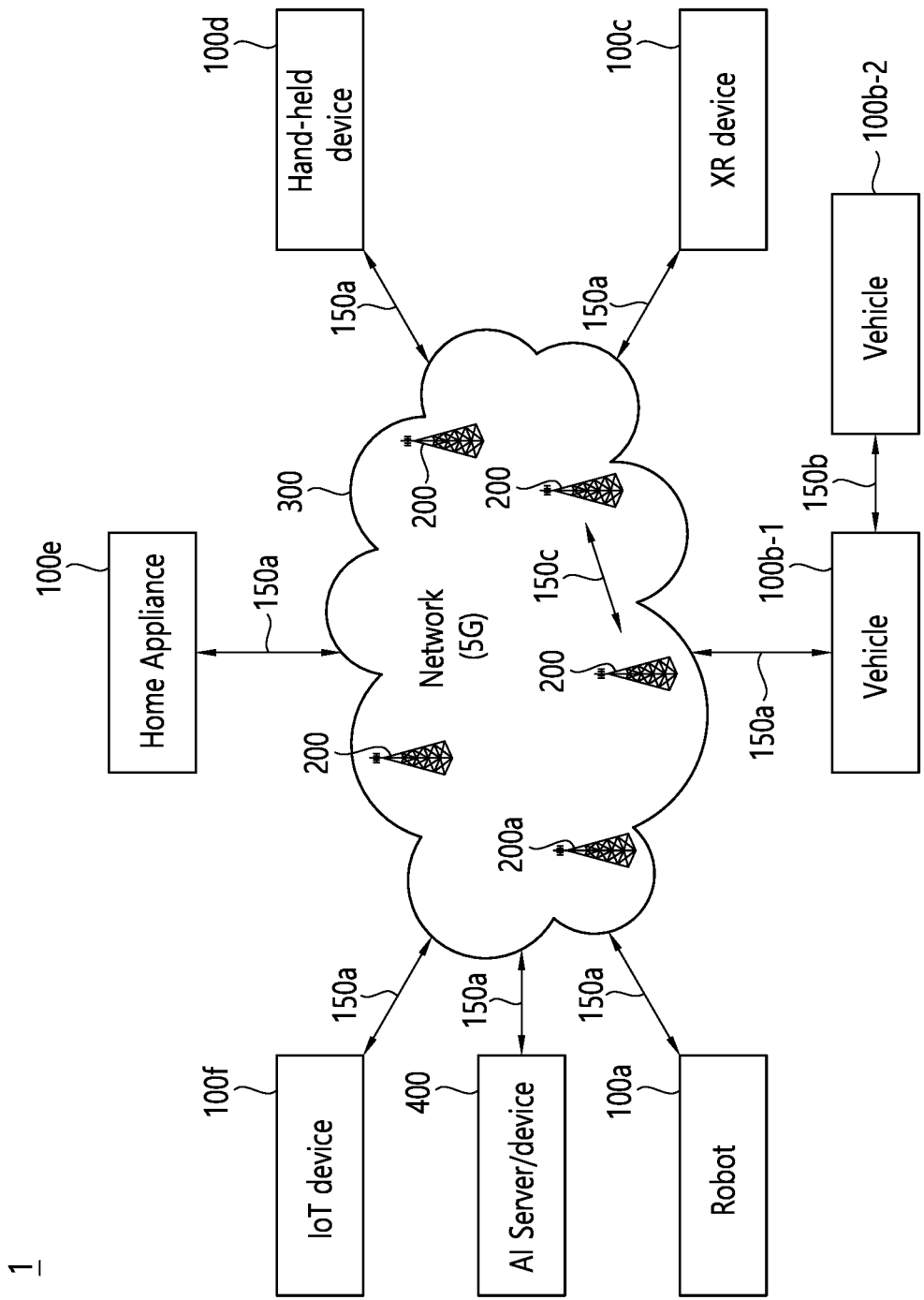
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or C". Accordingly, "A/B" may mean "only A", "only B", or "both A and/or B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
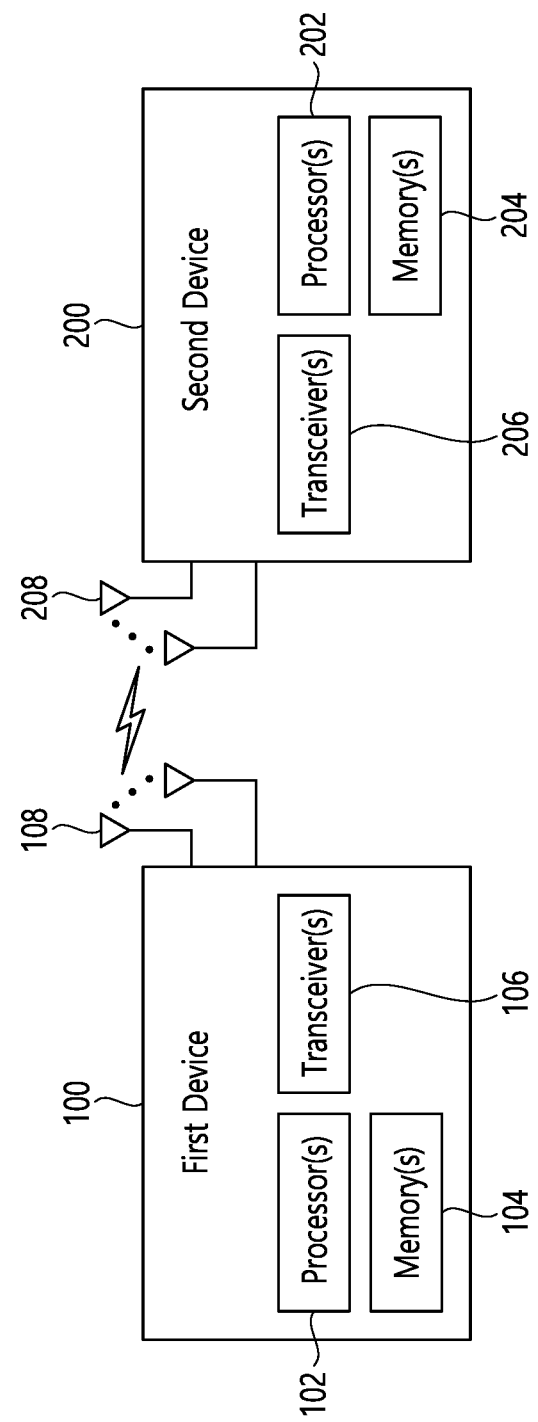
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
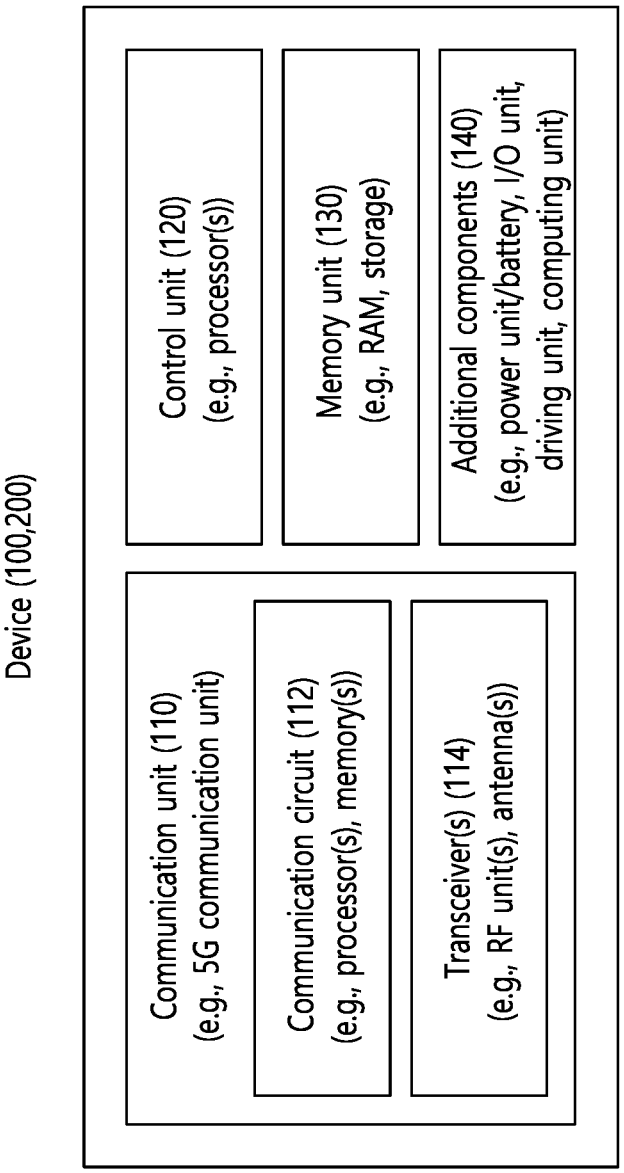
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
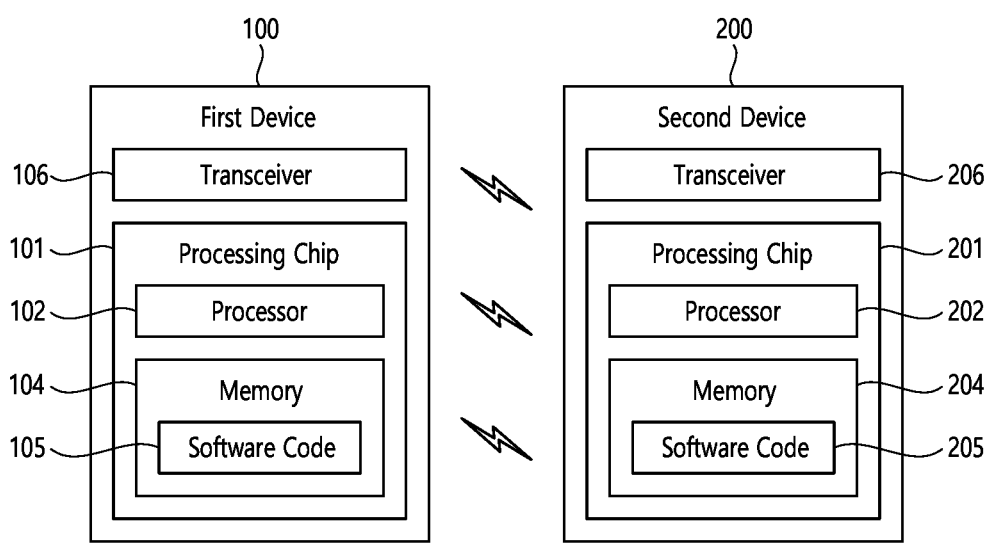
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
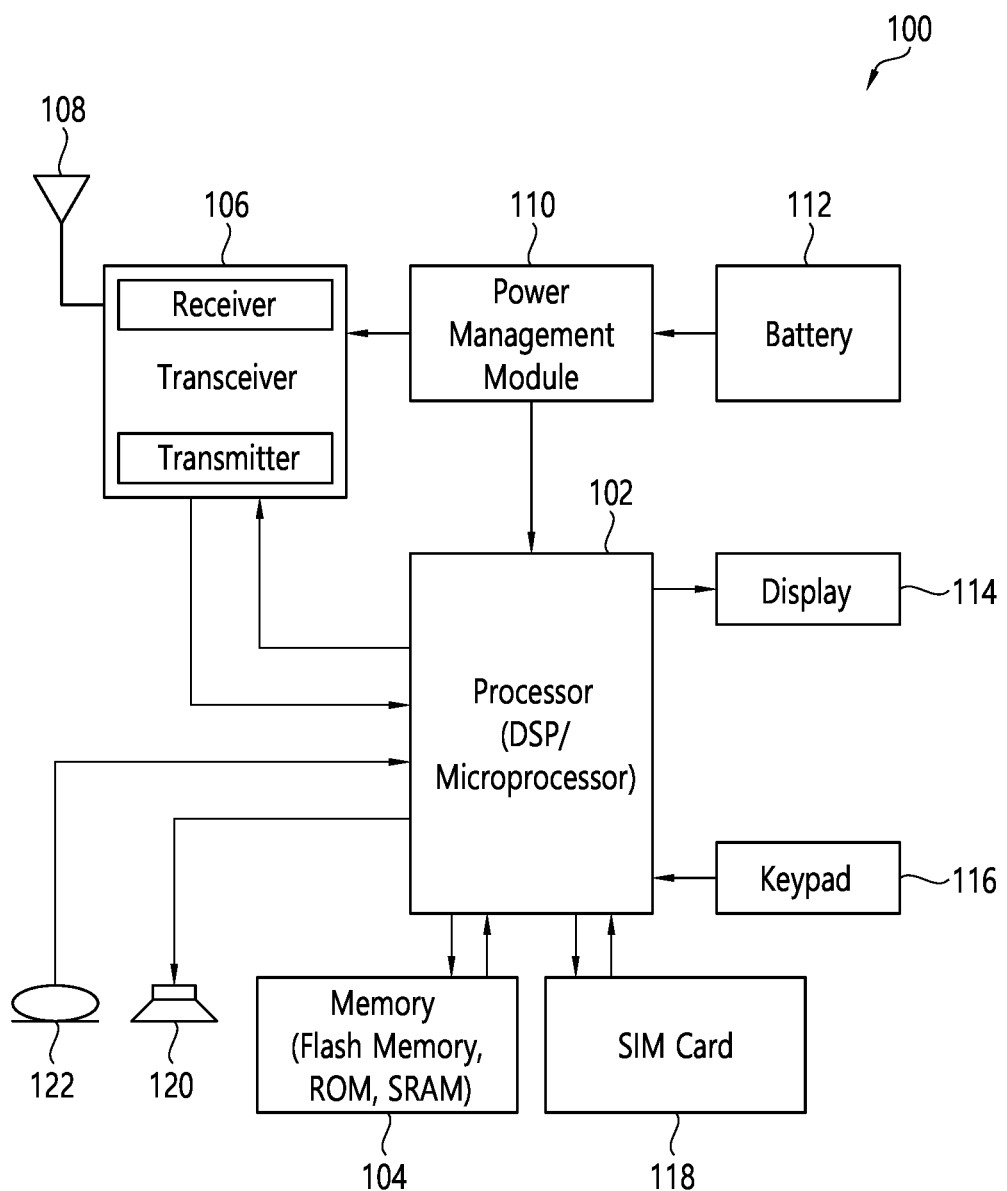
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
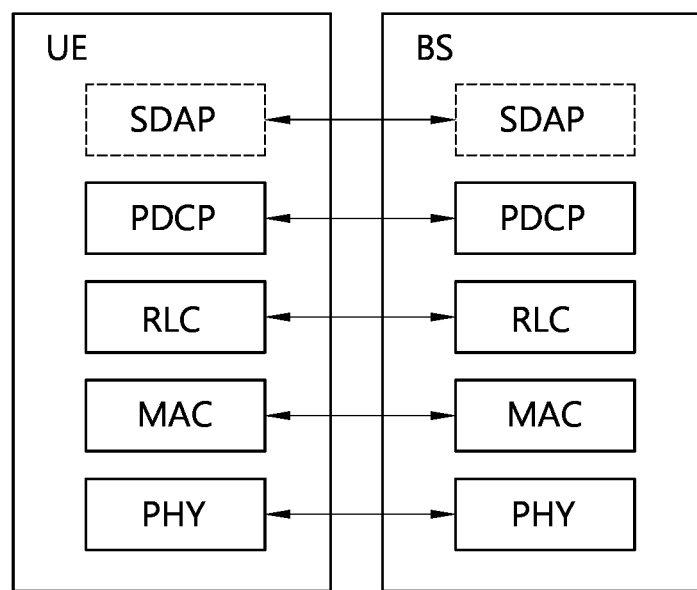
FIGS. 6 and 7 show an example of protocol stacks in a 3GPP based wireless communication system to which implementations of the present disclosure is applied.
Figure 7:
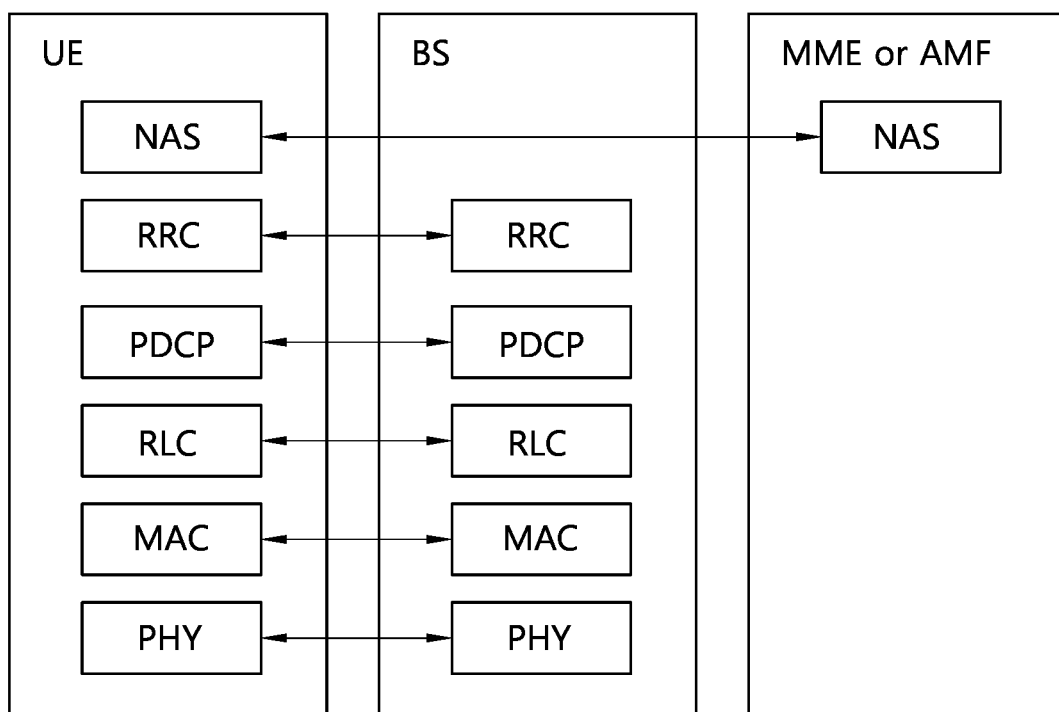

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
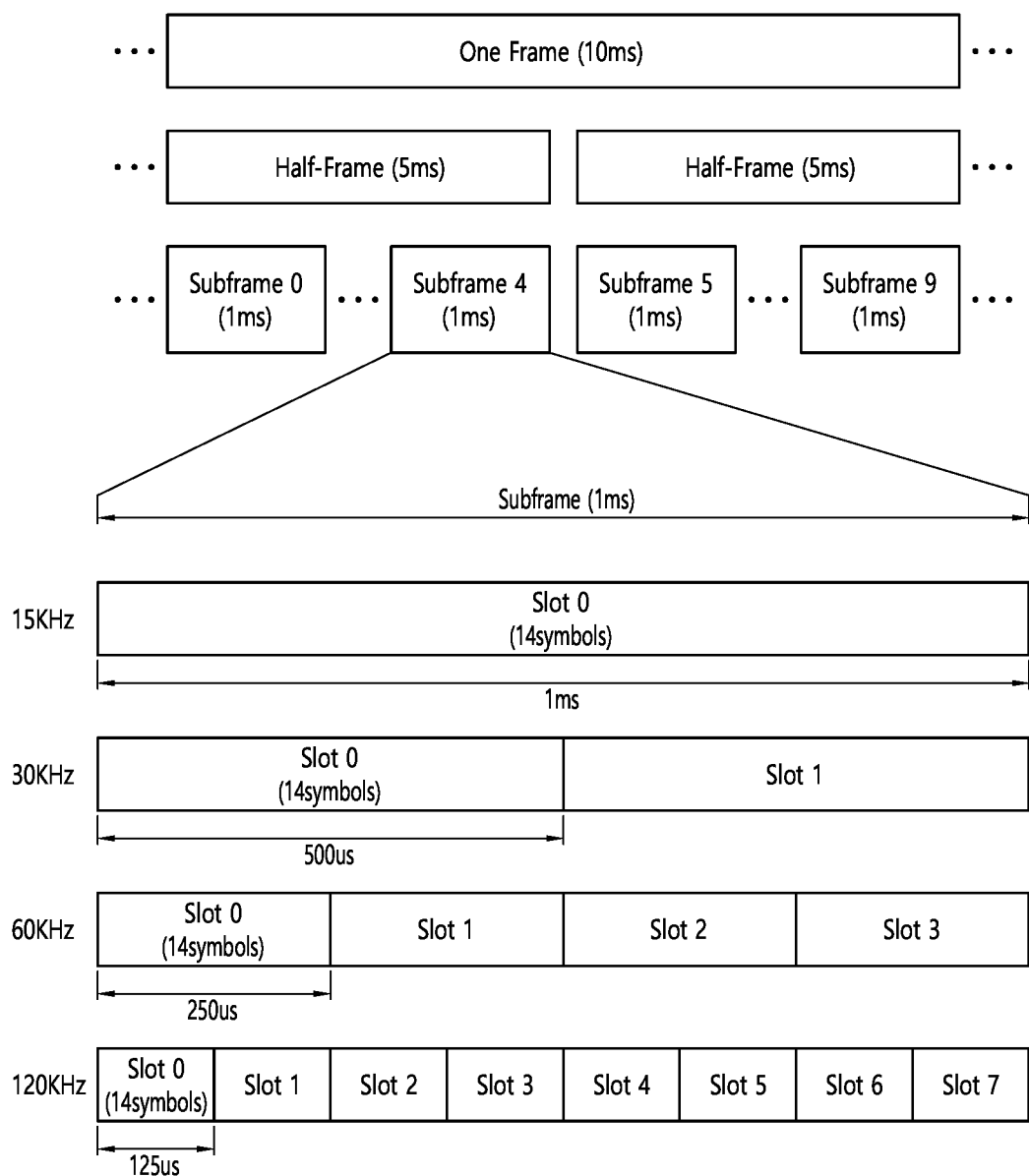
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
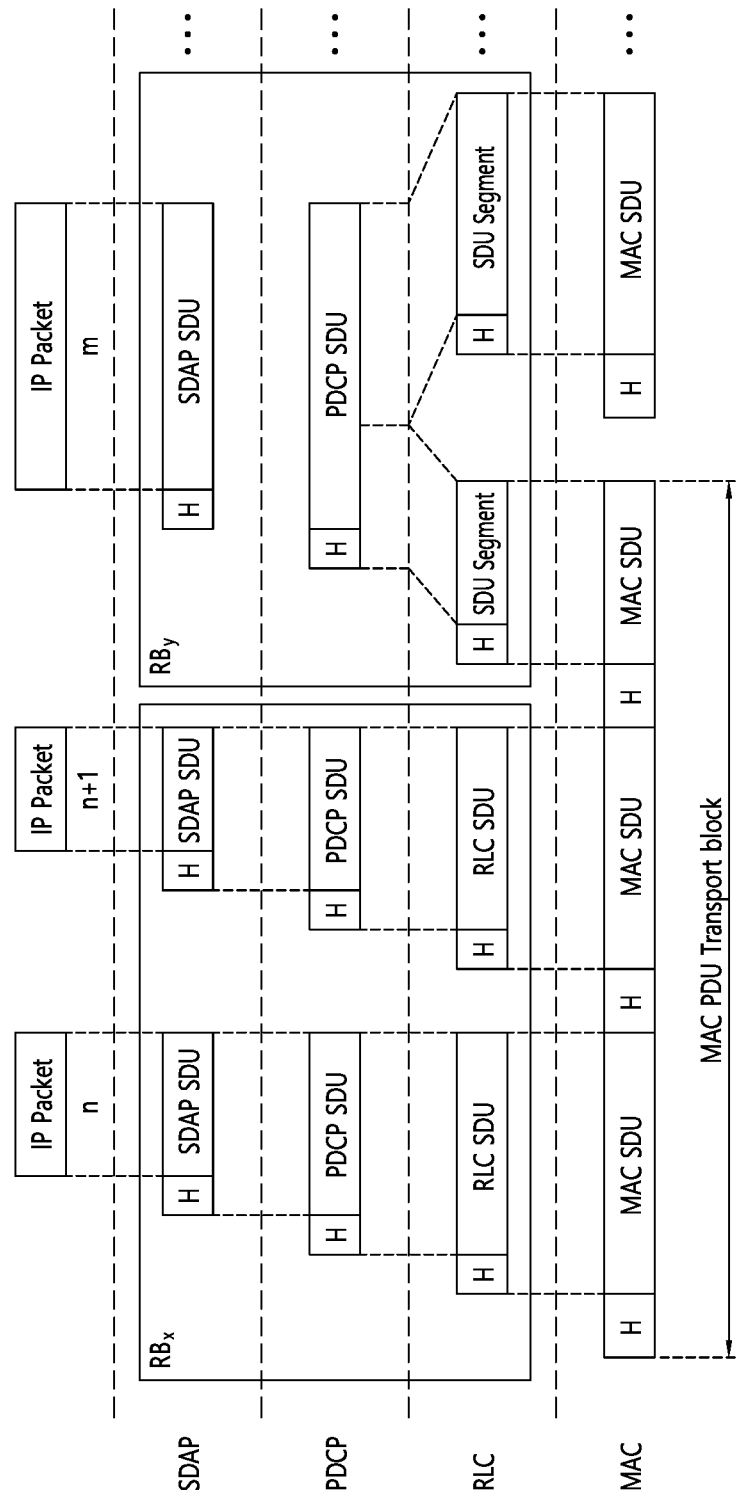
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

SDAP is described. Sections 4 and 5 of 3GPP TS 37.324 V15.1.0 can be referred.

For the SDAP, the following definitions may be applied.
QoS flow to DRB mapping rule: a mapping rule determining on which DRB packets of a QoS flow shall be carried.
Reflective QoS flow to DRB mapping: a QoS flow to DRB mapping scheme where a UE monitors the QoS flow to DRB mapping rule in the DL, and applies it to in the UL.

Figure 10:
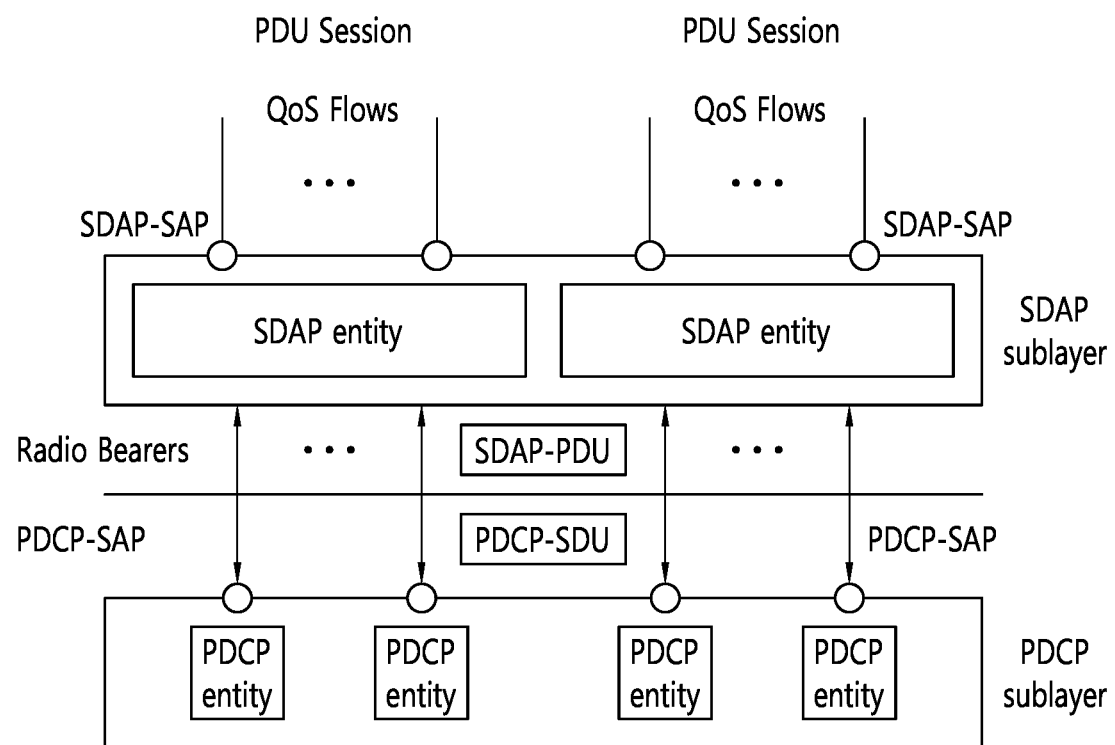
FIG. 10 shows one possible structure for SDAP sublayer to which implementations of the present disclosure is applied.

FIG. 10 shows one possible structure for SDAP sublayer to which implementations of the present disclosure is applied.

The SDAP sublayer is configured by RRC. The SDAP sublayer maps QoS flows to DRBs. One or more QoS flows may be mapped onto one DRB. One QoS flow is mapped onto only one DRB at a time in the UL.

Figure 11:
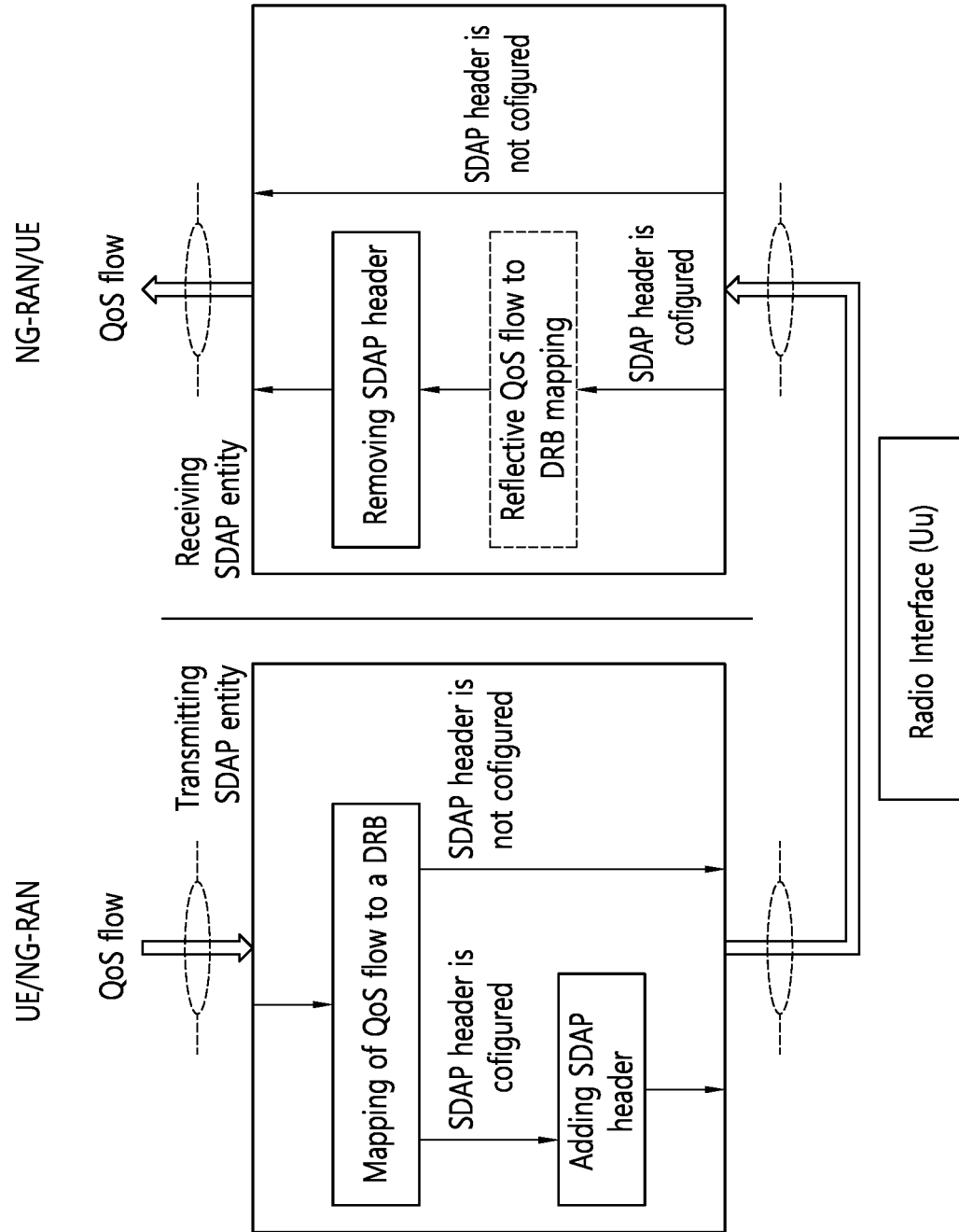
FIG. 11 shows an example of functional view of SDAP entity for SDAP sublayer to which implementations of the present disclosure is applied.

FIG. 11 shows an example of functional view of SDAP entity for SDAP sublayer to which implementations of the present disclosure is applied.

The SDAP entities are located in the SDAP sublayer. Several SDAP entities may be defined for a UE. There is an SDAP entity configured for each individual PDU session.

An SDAP entity receives/delivers SDAP SDUs from/to upper layers and submits/receives SDAP data PDUs to/from its peer SDAP entity via lower layers.

At the transmitting side, when an SDAP entity receives an SDAP SDU from upper layers, it constructs the corresponding SDAP data PDU and submits it to lower layers;
At the receiving side, when an SDAP entity receives an SDAP data PDU from lower layers, it retrieves the corresponding SDAP SDU and delivers it to upper layers.

Reflective QoS flow to DRB mapping is performed at UE, if DL SDAP header is configured.

The SDAP sublayer provides its service to the user plane upper layers. The following services are provided by SDAP to upper layers:
transfer of user plane data.
An SDAP entity expects the following services from lower layers:
user plane data transfer service;
in-order delivery except when out of order delivery is configured by RRC.
The SDAP sublayer supports the following functions:
transfer of user plane data;
mapping between a QoS flow and a DRB for both DL and UL;
marking QoS flow ID in both DL and UL packets;

reflective QoS flow to DRB mapping for the UL SDAP data PDUs.

SDAP entity handling is described.

When RRC requests an SDAP entity establishment, the UE shall:
  establish an SDAP entity;
  perform data transfer When RRC requests an SDAP entity release, the UE shall:
  release the SDAP entity.

Data transfer is described.

At the reception of an SDAP SDU from upper layer for a QoS flow, the transmitting SDAP entity shall:
  >if there is no stored QoS flow to DRB mapping rule for the QoS flow:
  >>map the SDAP SDU to the default DRB;
  >else:
  >>map the SDAP SDU to the DRB according to the stored QoS flow to DRB mapping rule;
  >if the DRB to which the SDAP SDU is mapped is configured by RRC with the presence of SDAP header,
  >>construct the UL SDAP data PDU;
  >else:
  >>construct the UL SDAP data PDU;
  >submit the constructed UL SDAP data PDU to the lower layers.

UE behavior is not defined if there is neither a default DRB nor a stored QoS flow to DRB mapping rule for the QoS flow.

Default DRB is always configured with UL SDAP header (3GPP TS 38.331 [3]).

At the reception of an SDAP data PDU from lower layers for a QoS flow, the receiving SDAP entity shall:
  >if the DRB from which this SDAP data PDU is received is configured by RRC with the presence of SDAP header:
  >>perform reflective QoS flow to DRB mapping;
  >>perform reflective QoS indication (RQI) handling;
  >>retrieve the SDAP SDU from the DL SDAP data PDU.
  >else:
  >>retrieve the SDAP SDU from the DL SDAP data PDU;
  >deliver the retrieved SDAP SDU to the upper layer.

QoS flow to DRB mapping is described.

When RRC configures an UL QoS flow to DRB mapping rule for a QoS flow, the SDAP entity shall:
  >if the SDAP entity has already been established and there is no stored QoS flow to DRB mapping rule for the QoS flow and a default DRB is configured:
  >>construct an end-marker control PDU for the QoS flow;
  >>map the end-marker control PDU to the default DRB;
  >>submit the end-marker control PDU to the lower layers.
  >if the stored UL QoS flow to DRB mapping rule is different from the configured QoS flow to DRB mapping rule for the QoS flow and the DRB according to the stored QoS flow to DRB mapping rule is configured by RRC with the presence of UL SDAP header:
  >>construct an end-marker control PDU for the QoS flow;
  >>map the end-marker control PDU to the DRB according to the stored QoS flow to DRB mapping rule;
  >>submit the end-marker control PDU to the lower layers.
  >store the configured UL QoS flow to DRB mapping rule for the QoS flow.

When RRC releases an UL QoS flow to DRB mapping rule for a QoS flow, the SDAP entity shall:
  >remove the UL QoS flow to DRB mapping rule for the QoS flow.

For each received DL SDAP data PDU with reflective QoS flow to DRB mapping indication (RDI) set to 1, the SDAP entity shall:
  >process the QFI field in the SDAP header and determine the QoS flow;
  >if there is no stored QoS flow to DRB mapping rule for the QoS flow and a default DRB is configured:
  >>construct an end-marker control PDU for the QoS flow;
  >>map the end-marker control PDU to the default DRB;
  >>submit the end-marker control PDU to the lower layers;
  >if the stored QoS flow to DRB mapping rule for the QoS flow is different from the QoS flow to DRB mapping of the DL SDAP data PDU and the DRB according to the stored QoS flow to DRB mapping rule is configured by RRC with the presence of UL SDAP header:
  >>construct an end-marker control PDU for the QoS flow;
  >>map the end-marker control PDU to the DRB according to the stored QoS flow to DRB mapping rule;
  >>submit the end-marker control PDU to the lower layers;
  >store the QoS flow to DRB mapping of the DL SDAP data PDU as the QoS flow to DRB mapping rule for the UL.

When RRC indicates that a DRB is released, the SDAP entity shall:
  >remove all QoS flow to DRB mappings associated with the released DRB RQI handling is described.

For each received DL SDAP data PDU with RQI set to 1, the SDAP entity shall:
  inform the NAS layer of the RQI and QFI.

Vehicle-to-everything (V2X) communication in 5G NR is described. Sections 5.2, 5.4 and 5.6 of 3GPP TS 23.287 V0.3.0 can be referred.

For V2X communication, two types of PC5 reference points exist: the LTE based PC5 reference point, and the NR based PC5 reference point. A UE may use either type of PC5 or both for V2X communication depending on the services the UE supports. The V2X communication over PC5 reference point supports roaming and inter-public land mobile network (PLMN) operations. V2X communication over PC5 reference point is supported when UE is "served by NR or E-UTRA" or when the UE is "not served by NR or E-UTRA".

A UE is authorized to transmit and receive V2X messages when it has valid authorization and configuration.

The V2X communication over PC5 reference point has the following characteristics:
  V2X communication over LTE based PC5 reference point is connectionless, i.e., broadcast mode at access stratum (AS) layer, and there is no signaling over PC5 for connection establishment.
  V2X communication over NR based PC5 reference point supports broadcast mode, groupcast mode, and unicast mode at AS layer. The UE will indicate the mode of communication for a V2X message to the AS layer. Signaling over control plane over PC5 reference point for unicast mode communication management is supported.
  V2X services communication support between UEs over PC5 user plane.
  V2X messages are exchanged between UEs over PC5 user plane. Both internet protocol (IP) based and non-IP based V2X messages are supported over PC5 reference point. For IP based V2X messages, only IP version 6 (IPv6) is used. IP version 4 (IPv4) is not supported.

The identifiers used in the V2X communication over PC5 reference point are described below in detail. UE decides on the type of PC5 reference point and Tx Profile to use for the transmission of a particular packet based on the configuration.

If the UE has an active emergency PDU session, the communication over the emergency PDU session shall be prioritized over V2X communication over PC5 reference point.

Broadcast mode of communication is supported over both LTE based PC5 reference point and NR based PC5 reference point. Therefore, when broadcast mode is selected for transmission over PC5 reference point, PC5 RAT selection needs to be performed based on configuration.

For LTE based PC5 reference point, broadcast mode is the only supported communication mode.

For NR based PC5 reference point, the broadcast mode also supports enhanced QoS handling.

Groupcast mode of communication is only supported over NR based PC5 reference point.

Unicast mode of communication is only supported over NR based PC5 reference point. When application layer initiates a V2X service which requires PC5 unicast communication, the UE establishes a PC5 unicast link with the corresponding UE.

After successful PC5 unicast link establishment, UE A and UE B use a same pair of Layer-2 IDs for subsequent PC5-S signaling message exchange and V2X service data transmission. V2X layer of the transmitting UE indicates to AS layer whether the message is for PC5-S signaling message (i.e., Direct Communication Accept, Link Layer Identifier Update Request/Response, Disconnect Request/Response) or service data transmission when it sends message over the established PC5 link. V2X layer of receiving UE handles message if it is PC5-S signaling message whilst the V2X layer of receiving UE forwards the message to the upper layer if it is application data message.

The unicast mode supports per-flow QoS model. During the unicast link establishment, each UEs self-assign PC5 link identifier and associate the PC5 link identifier with the unicast link profile for the established unicast link. The PC5 link identifier is a unique value within the UE. The unicast link profile identified by PC5 link identifier includes application layer identifier and Layer-2 ID of UE A, application layer identifier and Layer-2 ID of UE B and a set of PC5 QoS flow identifier(s) (PFI(s)). Each PFI is associated with QoS parameters (i.e., PC5 QoS indicator (PQI) and optionally range). The PC5 link identifier and PFI(s) are unchanged values for the established unicast link regardless of the change of application layer identifier and Layer-2 ID. The UE uses PFI to indicate the PC5 QoS flow to AS layer, therefore AS layer identifies the corresponding PC5 QoS flow even if the source and/or destination Layer-2 IDs are changed due to, e.g., privacy support. The UE uses PC5 link identifier to indicate the PC5 unicast link to V2X application layer, therefore V2X application layer identifies the corresponding PC5 unicast link even if there are more than one unicast link associated with one service type (e.g., the UE establishes multiple unicast links with multiple UEs for a same service type).

QoS handling for V2X communication is described.

For LTE based PC5, the QoS handling is defined based on proximity-based services (ProSe) per-packet priority (PPPP) and ProSe per-packet reliability (PPPR).

For NR based PC5, a QoS model is defined based on 5G QoS indicators (5Qis), with additional parameter of range. For the V2X communication over NR based PC5 reference point, a QoS flow is associated with a PC5 QoS profile that contains the QoS parameters. A set of PQIs are defined. The UE may be configured with a set of default PC5 QoS profiles to use for the V2X services. For NR based unicast, groupcast and broadcast PC5 communication, per-flow QoS model for PC5 QoS management shall be applied.

Figure 12:
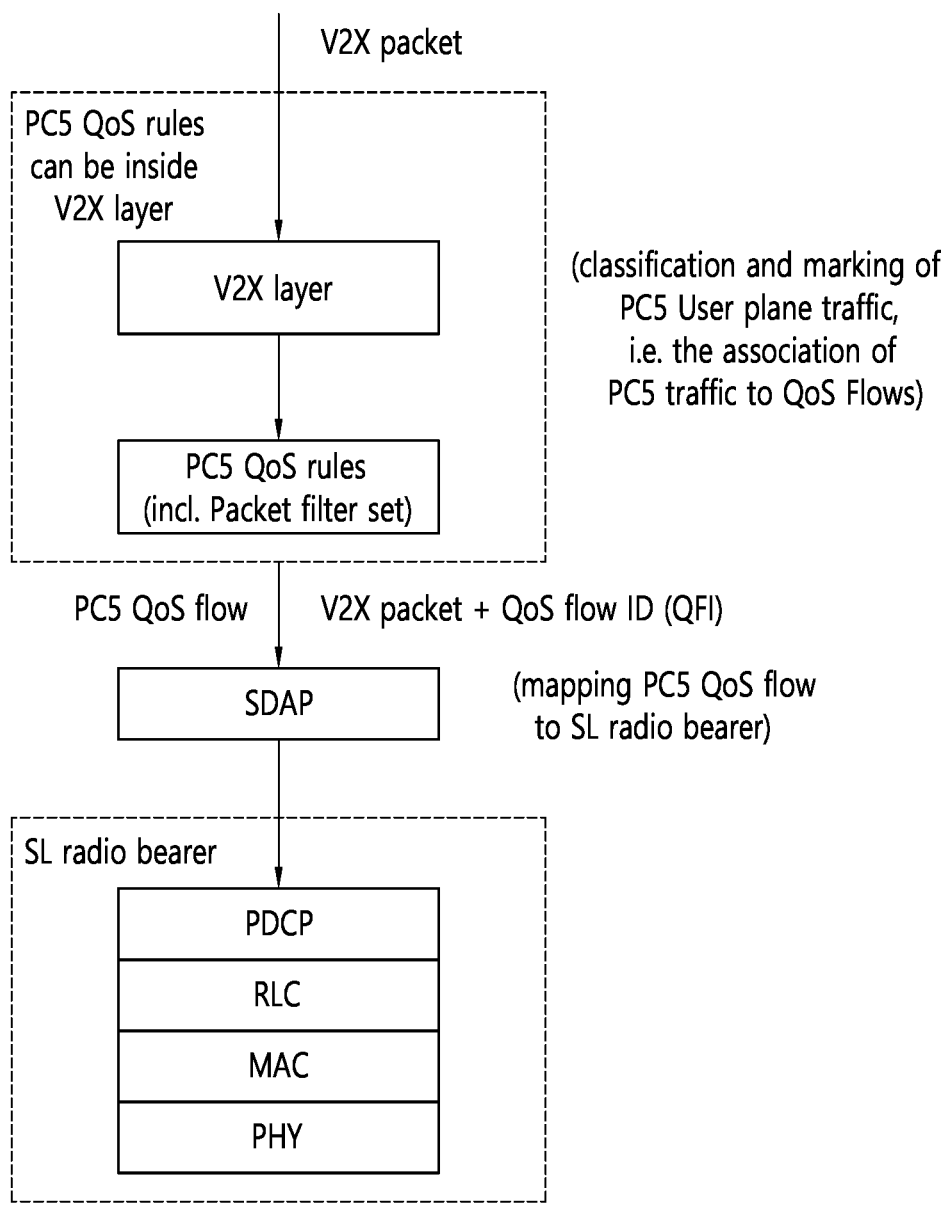
FIG. 12 shows an example mapping of per-flow QoS model for NR PC5 to which implementations of the present disclosure is applied.

FIG. 12 shows an example mapping of per-flow QoS model for NR PC5 to which implementations of the present disclosure is applied.

The following principles apply when the V2X communication is carried over PC5 reference point:

Application layer may set the QoS requirements for the V2X communication, using either PPPP and PPPR model or the PQI and range model. Depends on the type of PC5 reference point, i.e., LTE based or NR based, selected for the transmission, the UE may map the application layer provided QoS requirements to the suitable QoS parameters to be passed to the lower layer.

When groupcast or unicast mode of V2X communication over NR based PC5 is used, a range parameter is associated with the QoS parameters for the V2X communication. The range may be provided by V2X application layer or use a default value mapped from the service type based on configuration. The range indicates the minimum distance that the QoS parameters need to be fulfilled. The range parameter is passed to AS layer together with the QoS parameters for dynamic control.

NR based PC5 supports three types of communication mode, i.e., broadcast, groupcast, and unicast.

The UE may handle broadcast, groupcast, and unicast traffic by taking all their priorities, e.g., indicated by PQIs, into account.

For broadcast and groupcast modes of V2X communication over NR based PC5, standardized PQI values are applied by the UE, as there is no signaling over PC5 reference point for these cases.

When network scheduled operation mode is used, the UE-PC5-aggregate maximum bit rate (AMBR) for NR based PC5 applies to all types of communication modes, and is used by NG-RAN for capping the UE's NR based PC5 transmission in the resources management.

Followings are example of PC5 QoS parameters.

(1) PQI

A PQI is a special SQl, and is used as a reference to PC5 QoS characteristics, i.e., parameters that control QoS forwarding treatment for the packets over PC5 reference point.

Standardized PQI values have one-to-one mapping to a standardized combination of PC5 QoS characteristics.

(2) PC5 Flow Bit Rates

For guaranteed bit rate (GBR) QoS flows only, the following additional PC5 QoS parameters exist:

guaranteed flow bit rate (GFBR);

maximum flow bit rate (MFBR).

The GFBR and MFBR are used for bit rate control on PC5 reference point over the averaging time window. For PC5 communication, the same GFBR and MFBR are used for both directions.

(3) PC5 Link Aggregated Bit Rates

A PC5 unicast link is associated with the following aggregate rate limit QoS parameter:

per link AMBR (PC5 LINK-AMBR).

The PC5 LINK-AMBR limits the aggregate bit rate that can be expected to be provided across all non-GBR QoS flows with a peer UE over PC5 unicast link. The PC5 LINK-AMBR is measured over an AMBR averaging window which is a standardized value. The PC5 LINK-AMBR is not applicable to GBR QoS flows.

The AMBR averaging window is only applied to PC5 LINK-AMBR measurement.
(4) Range
(5) Default Values A UE may be configured with default values for PC5 QoS parameters for a particular service, e.g., identified by provider service identifier (PSID)/ITS application identifier (ITS-AID). The default value will be used if the corresponding PC5 QoS parameter is not provided by upper layer.

Identifiers for V2X communication is described.

Each UE has one or more Layer-2 IDs for V2X communication over PC5 reference point, consisting of:
Source Layer-2 ID(s); and
Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described below in detail. The source Layer-2 IDs may differ between different communication modes.

When IP-based V2X communication is supported, the UE configures a link local IPv6 address to be used as the source IP address. The UE may use this IP address for V2X communication over PC5 reference point without sending Neighbor Solicitation and Neighbor Advertisement message for Duplicate Address Detection.

If the UE has an active V2X application that requires privacy support in the current geographical area, as identified by configuration, in order to ensure that a source UE (e.g., vehicle) cannot be tracked or identified by any other UEs (e.g., vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g., when the application layer identifier changes, the source Layer-2 ID and the source IP address need to be changed.

For broadcast mode of V2X communication over PC5 reference point, the UE is configured with the destination Layer-2 ID(s) to be used for V2X services. The destination Layer-2 ID for a V2X communication is selected based on the configuration.

The UE self-selects a source Layer-2 ID. The UE may use different source Layer-2 IDs for different types of PC5 reference points, i.e., LTE based PC5 and NR based PC5.

For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g., PSID/ITS-AID) and Layer-2 ID.

The UE self-selects a source Layer-2 ID.

For unicast mode of V2X communication over PC5 reference point, the destination Layer-2 ID used depends on the communication peer, which is discovered during the establishment of the unicast link. The initial signaling for the establishment of the unicast link may use a default destination Layer-2 ID associated with the service type (e.g., PSID/ITS-AID) configured for unicast link establishment. During the unicast link establishment procedure, Layer-2 IDs are exchanged, and should be used for future communication between the two UEs.

The UE needs to maintain a mapping between the application layer identifiers and the source Layer-2 IDs used for the unicast links, as the V2X application layer does not use the Layer-2 IDs. This allows the change of source Layer-2 ID without interrupting the V2X applications.

When application layer identifiers changes, the source Layer-2 ID(s) of the unicast link(s) shall be changed if the link(s) was used for V2X communication with the changed application layer identifiers.

A UE may establish multiple unicast links with a peer UE and use the same or different source Layer-2 IDs for these unicast links.

In LTE sidelink communication, if a MAC SDU in sidelink transmission does not correspond to one of the existing sidelink radio bearer (SLRB), a receiving UE (RX UE) may configure a new SLRB. However, in NR sidelink communication using one-to-one PC5 communication, i.e., unicast mode, the RX UE may receive SLRB configuration from a transmitting UE (TX UE) and then configure a new SLRB based on the SLRB configuration.

Meanwhile, the concept of the QoS flow to DRB mapping has been introduced in 5G NR. Such concept of the QoS flow to DRB mapping should also be applied to SLRB for sidelink communication, and accordingly, the UE needs to support SDAP layer/entity for sidelink communication. However, currently it is not clear how the UE will establish a SDAP entity for sidelink communication together with SLRB configuration.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

In some implementations, the method in perspective of the wireless device described below may be performed by first wireless device 100 shown in FIG. 2, the wireless device 100 shown in FIG. 3, the first wireless device 100 shown in FIG. 4 and/or the UE 100 shown in FIG. 5.

In some implementations, the method in perspective of the wireless device described below may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

Figure 13:
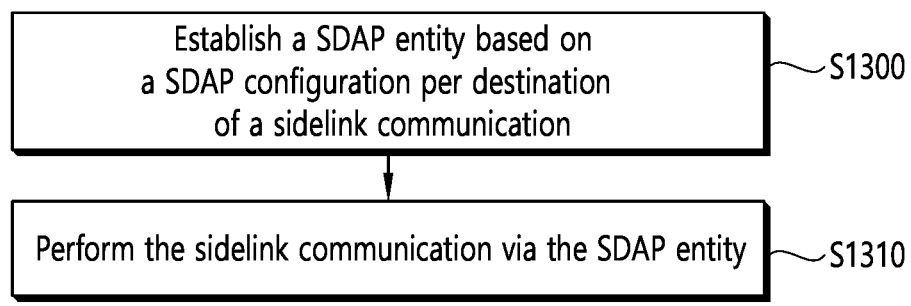
FIG. 13 shows an example of a method for a wireless device to which implementations of the present disclosure is applied.

FIG. 13 shows an example of a method for a wireless device to which implementations of the present disclosure is applied.

In some implementations, the wireless device may be in communication with at least one of a mobile device, a network, and/or autonomous vehicles other than the wireless device. The wireless device may be a transmitting wireless device (e.g., TX UE) of sidelink communication.

In step S1300, the wireless device establishes a SDAP entity based on a SDAP configuration per destination of a sidelink communication.

In some implementation, the wireless device may transmit, to a network, a destination ID per destination of the sidelink communication and/or at least one QoS parameter per destination of the sidelink communication. For example, the wireless may transmit to the network which destination is used for sidelink communication and which value of at least one QoS parameter is set for the indicated destination.

In some implementations, the wireless device may transmit, to the network, QFI per destination of the sidelink communication. For example, the UE may transmit to the network which QFI is set for the indicated destination. For this, the wireless device may receive, from a network, information on mapping between QFIs and QoS parameters.

In some implementations, the wireless device may transmit, to the network, a link ID per destination of the sidelink communication. For example, for unicast link between wireless devices for sidelink communication, the wireless device may transmit to the network which link ID is used for sidelink communication and which value of at least one QoS parameter is set for the indicated link ID. The wireless device may use different link IDs with different destinations for different one-to-one unicast link. In this case, the indicated destination (and/or a pair of the wireless device and the indicated destination) may be replaced by the link ID.

In some implementations, the QoS parameters may include at least one of PQI, PC5 Flow bit rates, PC5 link aggregated bit rates, communication range and/or default values.

In some implementations, the wireless device may receive, from a network, the SDAP configuration per destination of the sidelink communication. For example, the wireless device may receive a set of configuration of one or more SLRBs and a SDAP configuration for each established SLRB for each indicated destination from the network. The set of configuration of one or more SLRBs and a SDAP configuration may be mapped to each indicated destination (and the wireless device).

In some implementations, the SDAP configuration may include a QoS flow to DRB mapping rule per destination of the sidelink communication. The SDAP configuration may indicate the list of QFIs of sidelink QoS flows of the indicated destination to be additionally mapped to this SLRB. A QFI value may be included at most once in all SDAP configurations with the same destination. For QoS flow remapping, the QFI value of the remapped QoS flow may be only included in the SDAP configuration corresponding to the new SLRB and not included in the SDAP configuration corresponding to the old SLRB.

In some implementations, the SDAP configuration included in a SLRB configuration may indicate whether or not this is the default SLRB for this destination. Among all configured instances of SDAP configuration with the same destination, default SLRB may be configured in at most one SDAP configuration for the same destination.

In step S1310, the wireless device performs the sidelink communication via the SDAP entity.

In some implementations, the wireless device may transmit, to at least one destination of the sidelink communication, the SDAP configuration. For example, the wireless device may inform one or more wireless devices in the indicated destination about a set of configuration of one or more SLRBs and a SDAP configuration for each established SLRB for the indicated destination.

In some implementations, the wireless device may establish a SDAP entity for each destination before performing the sidelink communication. The SDAP entity may perform mapping between a QoS flow and a DRB and/or marking QoS flow ID in SL packets based on the SDAP configuration for a pair of the wireless device and the indicated destination.

Figure 14:
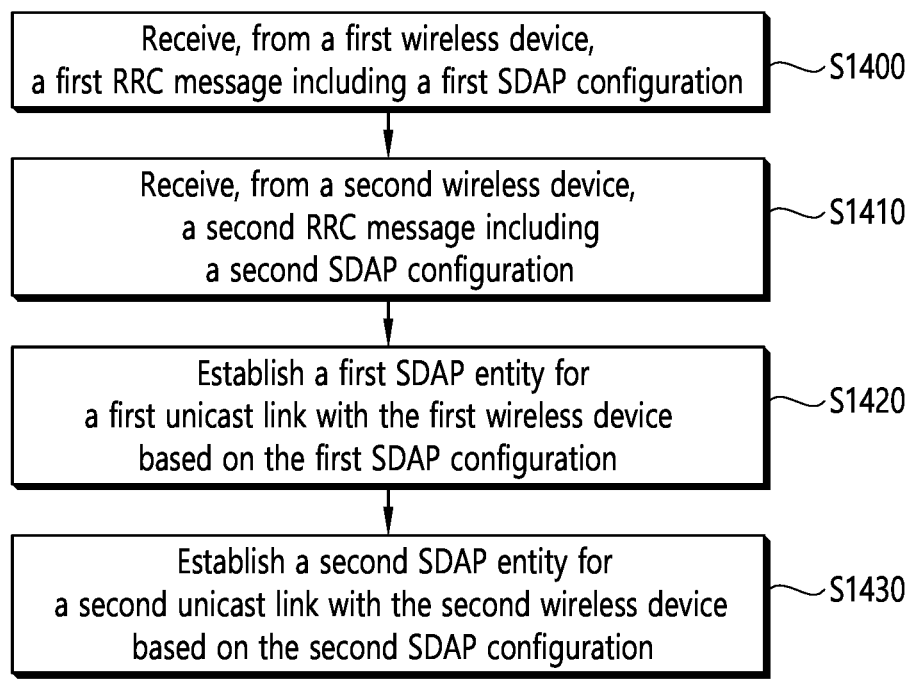
FIG. 14 shows another example of a method for a wireless device to which implementations of the present disclosure is applied.

FIG. 14 shows another example of a method for a wireless device to which implementations of the present disclosure is applied.

In some implementations, the wireless device may be in communication with at least one of a mobile device, a network, and/or autonomous vehicles other than the wireless device. The wireless device may be a receiving wireless device (e.g., RX UE) of sidelink communication.

In step S1400, the wireless device receives, from a first wireless device, a first RRC message including a first service data adaptation protocol (SDAP) configuration. In step S1410, the wireless device receives, from a second wireless device, a second RRC message including a second SDAP configuration.

In some implementations, the first SDAP configuration may be mapped to a pair of the wireless device and the first wireless device, and the second SDAP configuration may be mapped to a pair of the wireless device and the second wireless device.

In some implementations, the first SDAP configuration may be mapped to the first unicast link, and the second SDAP configuration may be mapped to the second unicast link.

For example, the wireless device may receive a set of configuration of one or more SLRBs and a SDAP configuration for each established SLRB for a particular destination and/or link ID from each of the first/second wireless devices. The set of configuration of one or more SLRBs and a SDAP configuration may be mapped to a pair of the wireless device and each of the first/second wireless devices, indicated by sidelink control information (SCI) and/or the destination in the header of the MAC PDU. Or, the set of configuration of one or more SLRBs and a SDAP configuration may be mapped to the link ID indicated by the SCI and/or the destination in the header of the MAC PDU, and/or by a PC5-S message or a PC5-RRC message received from each of the first/second wireless devices.

In step S1420, the wireless device establishes a first SDAP entity for a first unicast link with the first wireless device based on the first SDAP configuration. In step S1430, the wireless device establishes a second SDAP entity for a second unicast link with the second wireless device based on the second SDAP configuration.

For example, upon receiving the set of configuration of one or more SLRBs and a SDAP configuration, the wireless device may establish a SDAP entity for each destination and/or each link ID before performing sidelink communication with each of the first/second wireless devices in the indicated destination and/or each link ID.

In some implementations, the first/second SDAP entity may perform mapping between a QoS flow and a DRB and/or marking QoS flow ID in SL packets based on the first/second SDAP configuration for a pair of the wireless device and the indicated destination.

Figure 15:
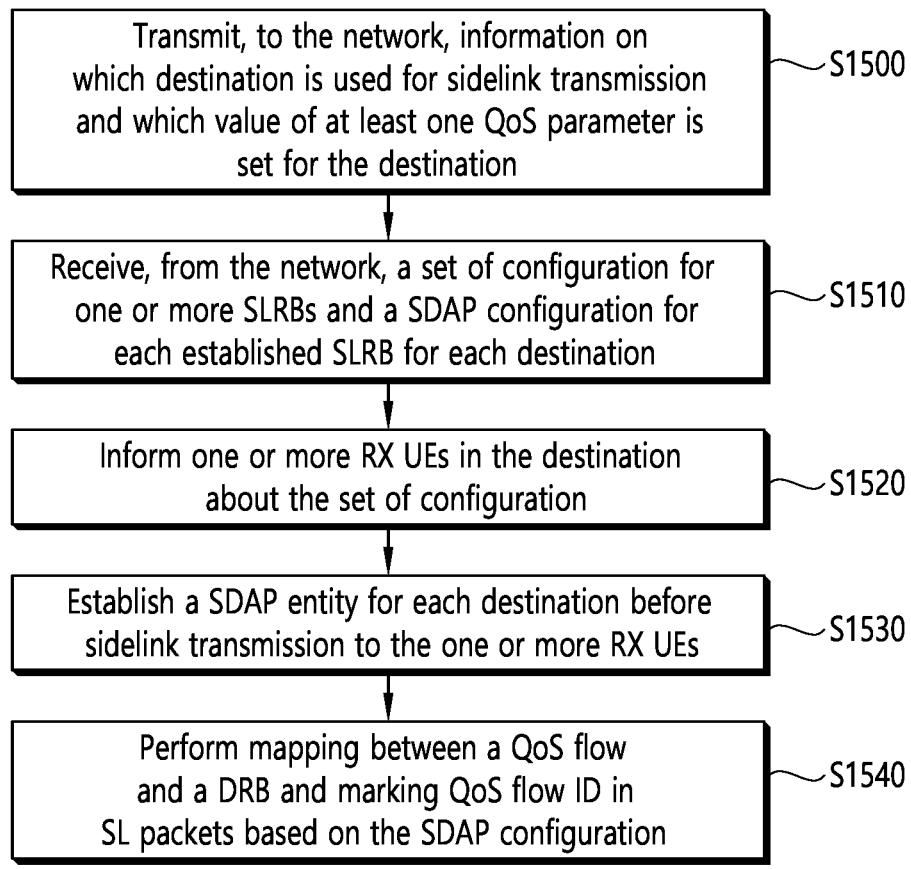
FIG. 15 shows an example of a method for performing sidelink communication for a TX UE (i.e., the source UE) to which implementations of the present disclosure is applied.

FIG. 15 shows an example of a method for performing sidelink communication for a TX UE (i.e., the source UE) to which implementations of the present disclosure is applied.

In some implementations, when the TX UE enters RRC_CONNECTED, the base station may receive QoS parameters from the core network, such as access and mobility function (AMF) and/or policy control function (PCF).

In some implementations, the QoS parameters may be carried as part of the initial UE context.

In some implementations, the QoS parameters may include at least one of PQI, PC5 flow bit rates, PC5 link aggregated bit rates, communication range (e.g., distance between TX UE and RX UE) and/or default values.

In step S1500, the TX UE transmits, to the base station, information on which destination is used for sidelink transmission and/or which value of at least one QoS parameter is set for the indicated destination.

Alternatively, the TX UE may transmit, to the base station, which QFI is set for the indicated destination. Before transmitting this information, the base station may receive information on mapping between QFI and QoS parameter value from the core network.

Alternatively, for unicast link between two UEs for sidelink communication, the TX UE may transmit, to the base station, which link ID is used for sidelink transmission and which value of at least one QoS parameter is set for the indicated link ID. The TX UE may use different link IDs with different destination UEs for different one-to-one communications (e.g., one-to-one unicast link). In this case, destination described below may be replaced by the link ID.

In some implementations, upon receiving information on which destination is used for sidelink transmission and/or which value of at least one QoS parameter is set for the indicated destination, the base station may determine establishment of one or more SLRBs and a SDAP configuration for each established SLRB for a pair of the TX UE and the indicated destination.

In some implementations, the SDAP configuration may include QoS flow to DRB mapping rule for each destination. The SDAP configuration may indicate the list of QFIs of SL QoS flows of the indicated destination to be additionally mapped to this SLRB. A QFI value may be included at most once in all SDAP configurations with the same destination. For QoS flow remapping, the QFI value of the remapped QoS flow may be only included in the SDAP configuration corresponding to the new SLRB and not included in the SDAP configuration corresponding to the old SLRB.

In some implementations, the SDAP configuration included in a SLRB configuration may indicate whether or not this is the default SLRB for this destination. Among all configured instances of SDAP configuration with the same destination, default SLRB may be configured in at most one SDAP configuration for the same destination.

In step S1510, the TX UE receives, from the base station, a set of configuration of one or more SLRBs and a SDAP configuration for each established SLRB for each indicated destination. The set of configuration of one or more SLRBs and a SDAP configuration may be mapped to each indicated destination (and/or the TX UE).

In step S1520, upon receiving the set of configuration of one or more SLRBs and a SDAP configuration, the TX UE informs one or more RX UEs in the indicated destination about a set of configuration of one or more SLRBs and a SDAP configuration for each established SLRB for the indicated destination.

In step S1530, the TX UE establishes a SDAP entity for each destination before sidelink transmission to RX UEs in the indicated destination (i.e., for the pair of the TX UE and the indicated destination).

In some implementations, upon receiving the set of configuration of one or more SLRBs and a SDAP configuration from the TX UE, the RX UE may establish a SDAP entity for the pair of the TX UE and the indicated destination.

In step S1540, the TX UE (e.g., SDAP entity of the TX UE) performs mapping between a QoS flow and a DRB and/or marking QoS flow ID in SL packets based on the SDAP configuration for a pair of the TX UE and the indicated destination.

Figure 16:
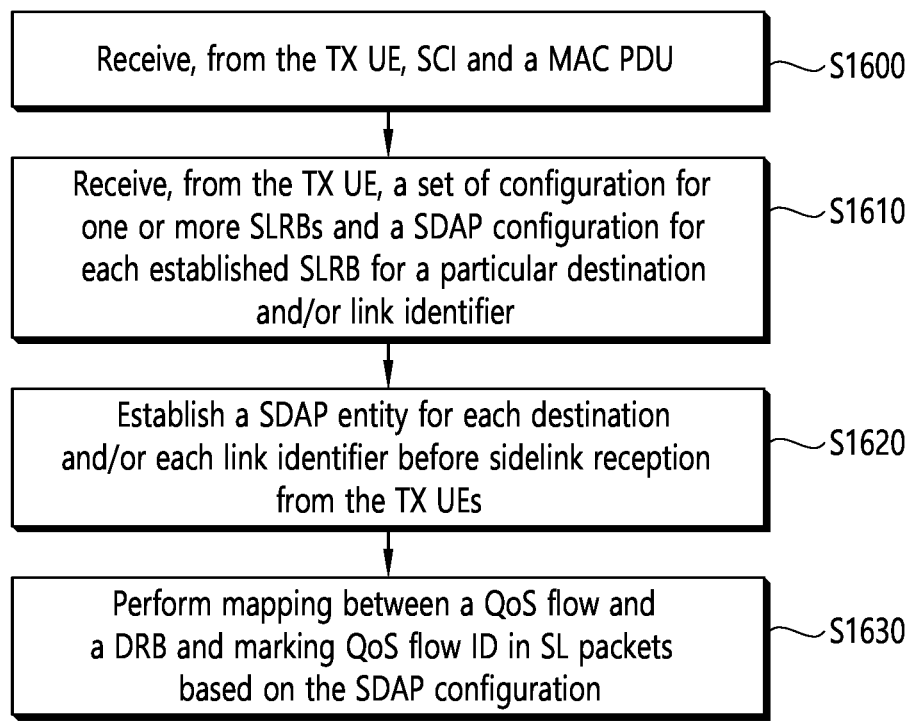
FIG. 16 shows an example of a method for performing sidelink communication for a RX UE (i.e., the destination UE) to which implementations of the present disclosure is applied.

FIG. 16 shows an example of a method for performing sidelink communication for a RX UE (i.e., the destination UE) to which implementations of the present disclosure is applied.

In step S1600, the RX UE receives, from a TX UE (i.e., source UE) SCI and/or a MAC PDU on the sidelink shared channel (SL-SCH).

In step S1610, the RX UE receives, from the TX UE, a set of configuration of one or more SLRBs and a SDAP configuration for each established SLRB for a particular destination and/or link ID.

In some implementations, the set of configuration of one or more SLRBs and a SDAP configuration may be mapped to the source and/or destination indicated by the SCI and/or the destination in the header of the MAC PDU. Alternatively, the set of configuration of one or more SLRBs and a SDAP configuration may be mapped to the link ID indicated by the SCI and/or the destination in the header of the MAC PDU, and/or by a PC5-S message and/or a PC5-RRC message received from the TX UE.

In step S1520, upon receiving the set of configuration of one or more SLRBs and a SDAP configuration, the RX UE establishes a SDAP entity for each destination and/or each link ID before sidelink reception from the TX UEs in the indicated destination and/or each link ID.

In step S1630, the RX UE (e.g., SDAP entity of the RX UE) performs mapping between a QoS flow and a DRB and/or marking QoS flow ID in SL packets for sidelink reception based on the SDAP configuration.

In the present disclosure, a particular destination may be replaced by a group of UEs or a service. Different SDAP entities may be established for different destinations. The SDAP configuration may include information on mapping between QFIs and SLRBs. The UE may perform mapping between QFIs and QoS parameters received from the network via a NAS message and/or mapping between QFIs and SLRBs received from the base station via a RRC message for sidelink transmission.

Figure 17:
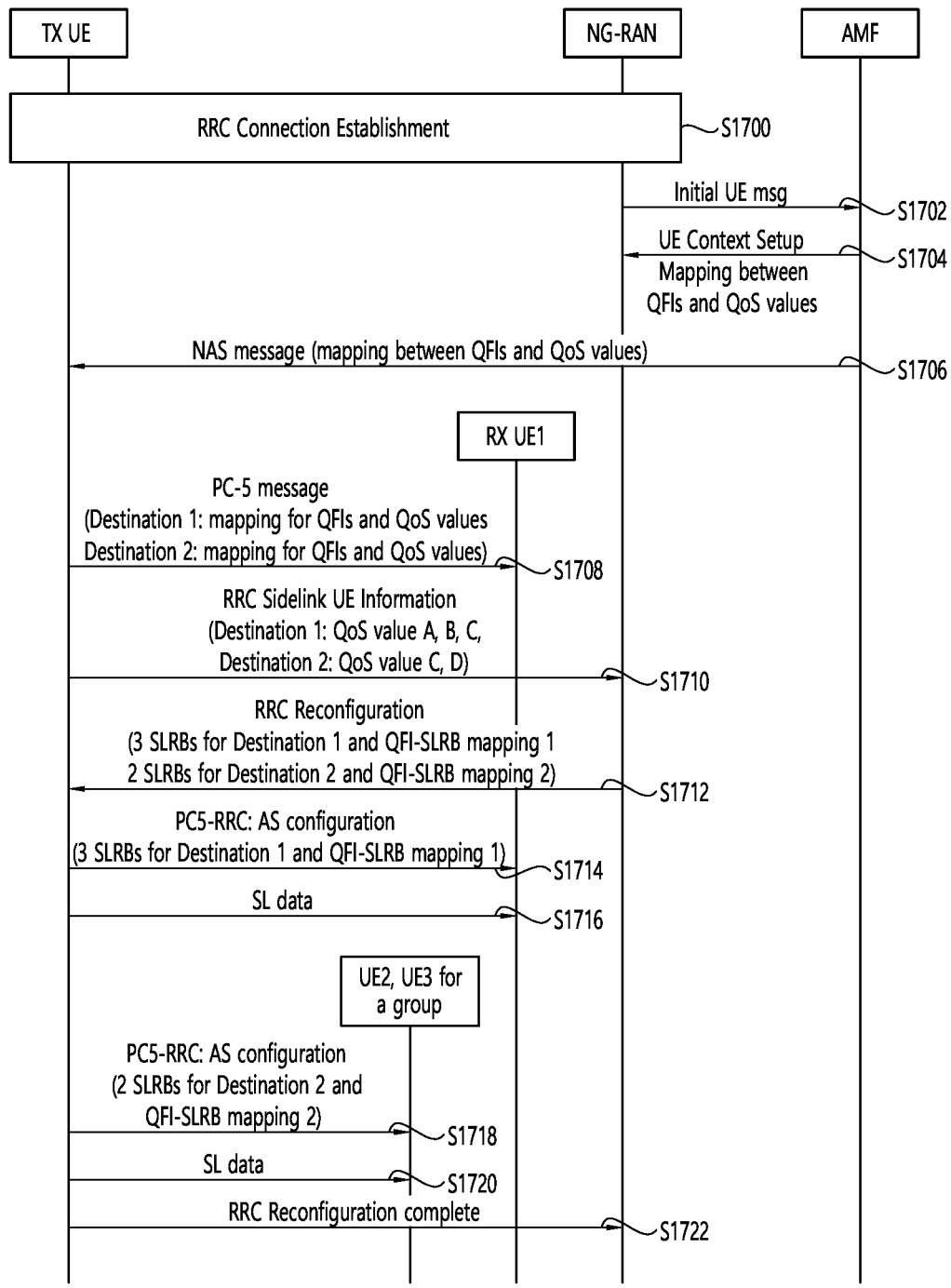
FIG. 17 shows an example of configuration of SDAP entities for sidelink transmission and reception with QoS flows to which implementations of the present disclosure is applied.

FIG. 17 shows an example of configuration of SDAP entities for sidelink transmission and reception with QoS flows to which implementations of the present disclosure is applied.

In step S1700, when a UE (e.g., TX UE) enters RRC_CONNECTED, a UE performs RRC connection establishment procedure with NG-RAN (e.g., gNB).

In step S1702, the NG-RAN requests the initial UE context to the AMF. In this case, the UE may inform the core network about the list of destinations that the UE may use for sidelink communication, e.g., via an initial UE NAS message. Thus, mapping between QFIs and the PC5 QoS parameters may be stored in the UE context for each indicated destination.

In step S1704, the AMF may send the PC5 QoS parameters to the NG-RAN via signaling (e.g., UE Context Setup procedure). The PC5 QoS parameters may be stored in the UE context after the registration procedure. If the UE is authorized to use V2X communication over PC5 reference point but AMF does not have PC5 QoS parameters available, the AMF may fetch the PC5 QoS parameters from the PCF.

In some implementations, when the UE registers to the network, the PCF in the network may provide mapping between QFIs and the PC5 QoS parameters to the NG-RAN via AMF for the UE. The AMF may store such information as part of the UE context so that the AMF may provide mapping between QFIs and the PC5 QoS parameters to the NG-RAN during connection setup procedure between NG-RAN and AMF, without interacting with PCF.

In step S1706, the core network may inform the UE and/or the NG-RAN about mapping between QFIs and the PC5 QoS parameters possibly for all destinations that the UE may use for sidelink communication.

In some implementations, the QoS parameters may include at least one of PQI, PC5 flow bit rates, PC5 link aggregated bit rates, communication range (e.g., distance between TX UE and RX UE) and/or default values.

In step S1708, the TX UE transmits PC5 message to the RX UE1. The PC5 message may include mapping for QFIs and QoS values for destination 1 and mapping for QFIs and QoS values for destination 2.

In step S1710, if the TX UE has data to perform sidelink transmission, the TX UE in RRC_CONNECTED transmits RRC sidelink UE information to the NG-RAN.

In some implementations, the sidelink RRC sidelink UE information include information on which destination is used for sidelink transmission and/or which value of at least one QoS parameter is set for the indicated destination. For example, the RRC sidelink UE information may include information that QoS values A, B, C is set for the destination 1 and QoS values C, D is set for the destination 2.

In some implementations, the TX UE may indicate to the NG-RAN which destination is used for sidelink transmission and/or which QFI(s) is set for the indicated destination.

In some implementations, for unicast link between two UEs for sidelink communication, the TX UE may indicate to the base station which link ID is used for sidelink transmission and/or which value of at least one QoS parameter is set for the indicated link ID. The TX UE may use different link IDs with different destination UEs for different one-to-one communications (e.g., one-to-one unicast link). In this case, destination described below may be replaced by the link ID.

In some implementations, upon receiving the indication from the TX UE, the NG-RAN may determine establishment of one or more SLRBs and a SDAP configuration for each established SLRB for a pair of the TX UE and the indicated destination (or the indicated link ID).

In some implementations, the SDAP configuration may include QoS flow to DRB mapping rule for each destination (or for each link ID). The SDAP configuration may indicate the list of QFIs of SL QoS flows of the indicated destination (or for the link ID) to be additionally mapped to this SLRB. A QFI value may be included at most once in all SDAP configurations with the same destination (or with the same link ID). For QoS flow remapping, the QFI value of the remapped QoS flow may be only included in the SDAP configuration corresponding to the new SLRB and not included in the SDAP configuration corresponding to the old SLRB.

In some implementations, the SDAP configuration included in a SLRB configuration may indicate whether or not this is the default SLRB for this destination (or for this link ID). Among all configured instances of SDAP configuration with the same destination (or with same link ID), default SLRB may be configured in at most one SDAP configuration for the same destination (or for the same link ID).

For example, the base station may determine establishment of 3 SLRBs and SDAP configuration for each of 3 SLRBs for a pair of the TX UE and the destination 1. The SDAP configuration may include QFI-SLRB mapping 1.

For example, the base station may further determine establishment of 2 SLRBs and SDAP configuration for each of 2 SLRBs for a pair of the TX UE and the destination 2. The SDAP configuration may include QFI-SLRB mapping 2.

In step S1712, the TX UE receives a set of configuration of one or more SLRBs and a SDAP configuration for each established SLRB for each indicated destination (or for this link ID). For example, the TX UE may receive two sets of configuration, e.g., one set for 3 SLRBs and SDAP configuration for each of 3 SLRBs for a pair of the TX UE and the destination 1, and the other set for 2 SLRBs and SDAP configuration for each of 2 SLRBs for a pair of the TX UE and the destination 2.

In some implementations, the set of configuration of one or more SLRBs and a SDAP configuration may be mapped to a pair of each indicated destination and the TX UE (or mapped to each link ID).

In some implementations, if the TX UE is in an idle state (e.g., RRC_IDLE) and/or an inactive state (e.g., RRC_INACTIVE) or outside network coverage, the TX UE may retrieve the SDAP configuration from the pre-configuration stored in the TX UE for the destination and/or the link ID. In this case, the set of configuration of one or more SLRBs and a SDAP configuration may come from the pre-configuration stored in the TX UE.

In step S1714, upon receiving the set of configuration of one or more SLRBs and a SDAP configuration, at least for unicast link, the TX UE informs one or more RX UEs (e.g., RX UE1) in the indicated destination (or a RX UE associated with the link ID) about a set of configuration of one or more SLRBs and a SDAP configuration for each established SLRB for the indicated destination (or for the indicated link ID).

For example, the TX UE may transmit, to the RX UE1, the set of configuration for 3 SLRBs and SDAP configuration for each of 3 SLRBs for a pair of the TX UE and the destination 1.

In some implementations, the set of configuration of one or more SLRBs and a SDAP configuration may be carried over a PC5-RRC message. For transmission of the PC5-RRC message, the TX UE may indicate the indicated destination (or the link ID) via a SCI and/or the header of a MAC PDU on PSSCH scheduled based on the SCI.

In some implementation, the TX UE may inform one or more RX UEs in the indicated destination (or a RX UE associated with the link ID) about a SDAP configuration for the indicated destination (or for the indicated link ID).

In some implementation, the RX UE may receive SCI and/or a MAC PDU from via the SL-SCH from the TX UE. From the MAC PDU, the RX UE may receive a set of configuration of one or more SLRBs and a SDAP configuration for each established SLRB for a particular destination or link identifier from the TX UE.

In some implementation, the set of configuration of one or more SLRBs and a SDAP configuration may be mapped to the source and/or destination indicated by the SCI and/or the destination in the header of the MAC PDU.

In some implementation, the set of configuration of one or more SLRBs and a SDAP configuration may be mapped to the link ID indicated by the SCI and/or the destination in the header of the MAC PDU, or by a PC5-S message or a PC5-RRC message received from the TX UE.

In some implementation, the TX UE may establish a SDAP entity for each destination layer-2 ID and/or for each link ID before sidelink transmission to RX UEs in the indicated destination (i.e., for the pair of the TX UE and the indicated destination) and/or to RX UEs associated with the indicated link ID. In addition, the TX UE may also establish one or more SLRBs associated with the SDAP entity, map one or more QFIs to each SLRB, and map one or more QoS parameters (e.g., PC5 flow bit rates, PC5 link aggregated bit rates, communication range) to each QFI, based on a RRC message and a NAS message received from the network (and/or based on pre-configuration).

In some implementations, upon receiving the set of configuration of one or more SLRBs and a SDAP configuration from the TX UE, the RX UE may establish a SDAP entity for each destination layer-2 ID and/or for each link ID, based on the set of configuration of one or more SLRBs and a SDAP configuration. The RX UE may also establish one or more SLRBs associated with the SDAP entity, map one or more QFIs to each SLRB, and map one or more QoS parameters (e.g., PC5 flow bit rates, PC5 link aggregated bit rates, communication range) to each QFI, based on the set and a PC5-S message received from the TX UE.

In some implementations, if the set of configuration of one or more SLRBs and a SDAP configuration is not received from the TX UE, the RX UE may retrieve the SDAP configuration from the pre-configuration stored in the RX UE for the destination and/or the link ID. In this case, the set of configuration of one or more SLRBs and a SDAP configuration may come from the pre-configuration stored in the RX UE. In addition, the RX UE may also establish one or more SLRBs associated with the SDAP entity, map one or more QFIs to each SLRB, and map one or more QoS parameters (e.g. PC5 flow bit rates, PC5 link aggregated bit rates, communication range) to each QFI.

In some implementations, both the TX and RX UEs may configure the SDAP sublayer by RRC based on the SDAP configuration for a pair of the TX UE and the indicated destination (or for the indicated link ID).

In some implementations, the SDAP sublayer may map QoS flows to SLRBs. One or more QoS flows may be mapped onto one SLRB. One QoS flow may be mapped onto only one SLRB at a time in the SL.

In step S1716, the TX UE performs SL data transmission to the RX UE1.

In some implementations, for SL transmission, the SDAP entity in the TX UE may perform mapping between a QoS flow and a DRB and/or marking QoS flow ID in SL packets based on the SDAP configuration for a pair of the TX UE and the indicated destination (or for the indicated link ID).

In some implementations, For SL reception, upon receiving one or more SL packets in physical sidelink shared channel (PSSCH), the SDAP entity in the RX UE may perform reflective mapping between a QoS flow and a DRB based on the SDAP configuration and/or the marked QoS flow ID in SL packets for a pair of the indicated TX UE and the indicated destination (or for the indicated link ID). Namely, the RX UE may process the QFI field in the SDAP header and determine the QoS flow.

In step S1718, the TX UE transmits, to a group of the RX UE2 and RX UE3, the set of configuration for 2 SLRBs and SDAP configuration for each of 2 SLRBs for a pair of the TX UE and the destination 2.

In step S1720, the TX UE performs SL data transmission to the group of the RX UE2 and RX UE3.

In step S1722, the TX UE transmits a RRC Reconfiguration Complete message to the NG-RAN.

Figure 18:
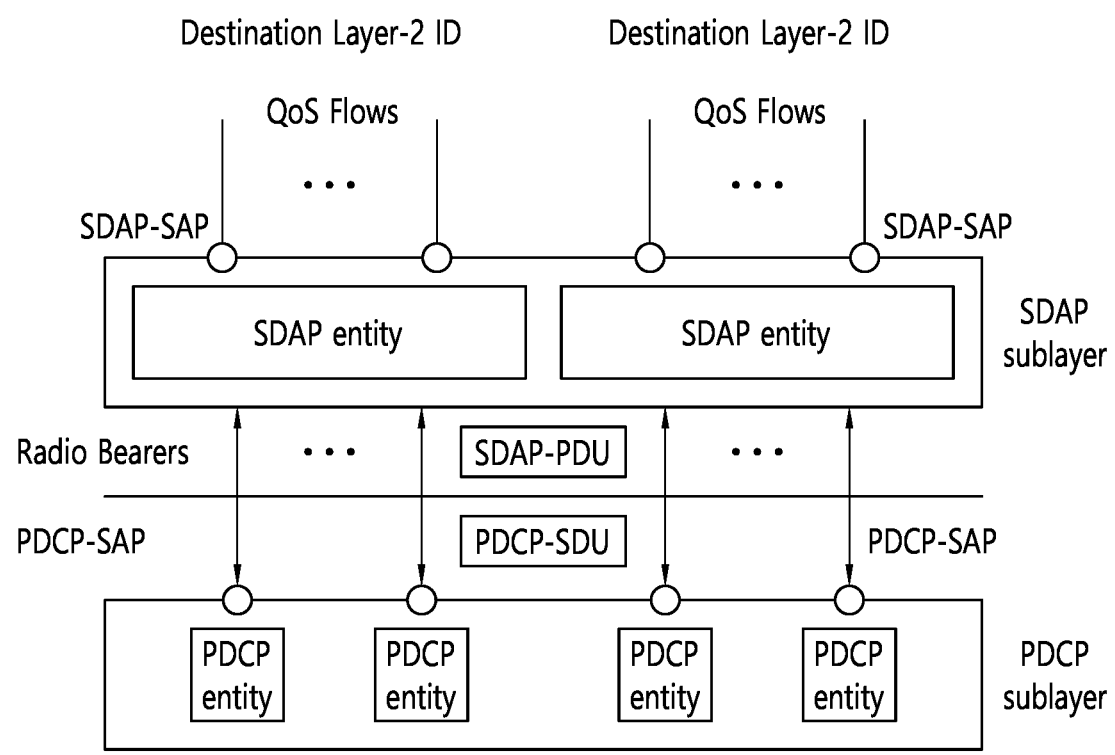
FIG. 18 shows an example of a SDAP entity to which implementations of the present disclosure.
Figure 19:
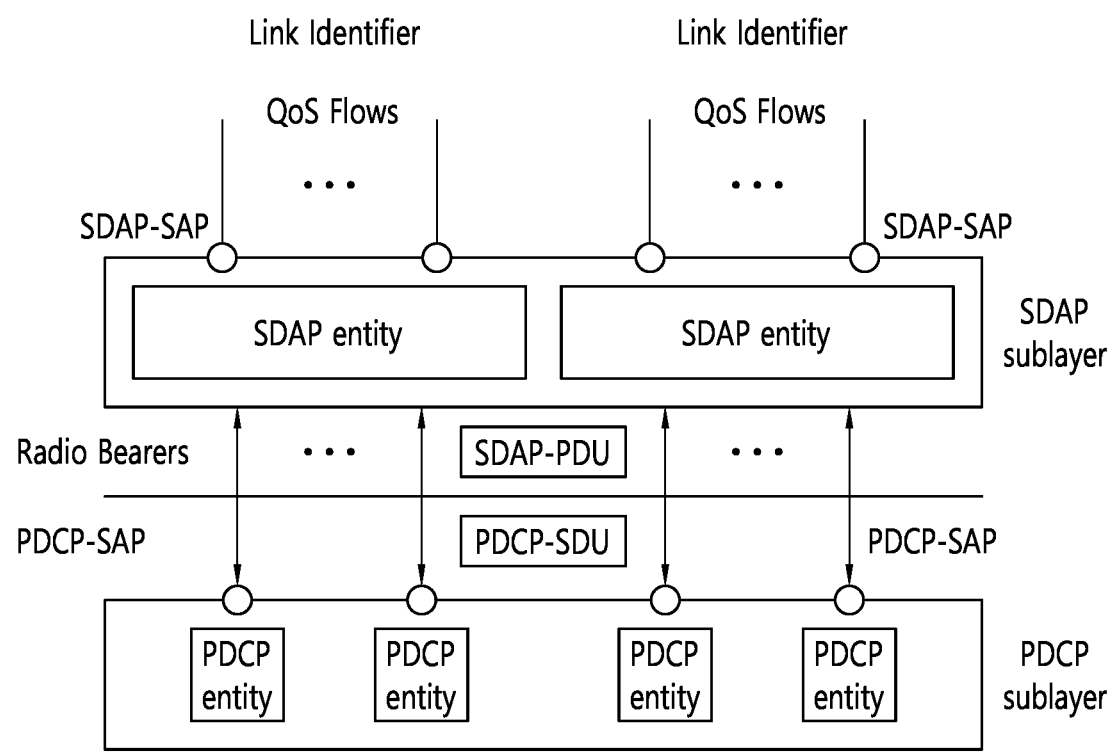
FIG. 19 shows another example of a SDAP entity to which implementations of the present disclosure.

FIG. 18 shows an example of a SDAP entity to which implementations of the present disclosure. FIG. 19 shows another example of a SDAP entity to which implementations of the present disclosure.

In FIG. 18, the SDAP entity is established for each destination layer-2 ID. In FIG. 19, the SDAP entity is established for each link ID.

In the present disclosure, sidelink resource allocation may be performed as follows.

In some implementations, if the TX UE is in RRC_CONNECTED and configured for network scheduled sidelink resource allocation, the TX UE may transmit sidelink UE information to the network. The sidelink UE information may include at least one of the followings: traffic pattern of service A, TX carriers and/or RX carriers mapped to service A, QoS information related to service A (e.g., 5QI, PPPP, PPPR, QCI value), service type of service A (e.g., unicast, groupcast, broadcast) and destination related to service A and/or another UE (e.g., destination ID, destination index or UE ID mapped to service A and/or the another UE).

In some implementations, after receiving the sidelink UE information, the network may construct sidelink configuration. The sidelink configuration may include at least one of the followings: one or more resource pools for service A and/or unicast transmission with another UE and Sidelink buffer status report (BSR) configuration such as mapping between a logical channel group (LCG) and one or more QoS values or mapping between a LCG and the service type of Service A. The network may signal the sidelink configuration to the TX UE and then the TX UE may configure lower layers with sidelink configuration.

In some implementations, if a message becomes available in L2 buffer for sidelink transmission, the TX UE may trigger scheduling request (SR) for sidelink signaling (e.g., a particular PSCCH or sidelink connection establishment), so that the TX UE transmits PUCCH resource mapped to sidelink signaling. If PUCCH resource is not configured, the TX UE may perform random access procedure as the scheduling request. If an uplink grant is given at a result of the SR, the TX UE may transmit sidelink BSR to the network. The sidelink BSR may indicate at least a destination index or UE Index, a LCG, and a buffer size corresponding to the destination service, the destination group or the destination UE. The destination index may address the destination service, the destination group or the destination UE. The UE index may address the destination/RX UE.

In some implementations, after receiving the SL BSR, the network may transmit a sidelink grant to the TX UE, e.g., by sending DCI in PDCCH. The DCI may include an allocated sidelink resource, the destination index and/or UE index. The index may be used to indicate the service A and/or the RX UE, explicitly or implicitly. If the TX UE receives the DCI, the TX UE may use the sidelink grant for transmission to the TX UE.

In some implementations, if the TX UE is configured for UE autonomous scheduling of sidelink resource allocation, the TX UE may autonomously select or reselect sidelink resources to create a sidelink grant used for transmission to the RX UE.

According to implementations of the present disclosure, in SL communication, the SDAP sublayer maps PC5 QoS flows to SL-DRBs. One or more PC5 QoS flows may be mapped onto one SL-DRB. One PC5 QoS flow is mapped onto only one SL-DRB at a time in the SL for transmission.

For SL, SDAP entity is configured per Destination Layer-2 ID and cast type (e.g., broadcast, groupcast, unicast) in the UE.

For SL transmission, at the reception of an SDAP SDU from upper layer for a PC5 QoS flow, the transmitting SDAP entity shall:

>if there is no stored PC5 QoS flow to SL-DRB mapping rule for the PC5 QoS flow:
>>map the SDAP SDU to the default SL-DRB;
>else:
>>map the SDAP SDU to the SL-DRB according to the stored PC5 QoS flow to SL-DRB mapping rule;
>if the SL-DRB to which the SDAP SDU is mapped is configured by RRC with the presence of SDAP header,
>>construct the SL SDAP data PDU;
>else:
>>construct the SL SDAP data PDU;
>submit the constructed SL SDAP data PDU to the lower layers.

For SL reception, at the reception of an SDAP data PDU from lower layers for a PC5 QoS flow, the receiving SDAP entity shall:
>if the SL-DRB from which this SDAP data PDU is received is configured by RRC with the presence of SDAP header:
>>retrieve the SDAP SDU from the SL SDAP data PDU.
>else:
>>retrieve the SDAP SDU from the SL SDAP data PDU;
>deliver the retrieved SDAP SDU to the upper layer.

For PC5 QoS flow to SL-DRB mapping, when RRC configures a PC5 QoS flow to SL-DRB mapping rule for a PC5 QoS flow, the SDAP entity shall:

>for unicast of NR SL communication, if the SDAP entity has already been established and there is no stored SL-DRB mapping rule for the PC5 QoS flow and a default SL-DRB is configured:
>>construct an end-marker control PDU for the PC5 QoS flow;
>>map the end-marker control PDU to the default SL-DRB;
>>submit the end-marker control PDU to the lower layers.
>for unicast of NR SL communication, if the stored PC5 QoS flow to SL-DRB mapping rule is different from the configured PC5 QoS flow to SL-DRB mapping rule for the PC5 QoS flow and the SL-DRB according to the stored PC5 QoS flow to SL-DRB mapping rule is configured by RRC with the presence of SL SDAP header:
>>construct an end-marker control PDU for the PC5 QoS flow;
>>map the end-marker control PDU to the SL-DRB according to the stored PC5 QoS flow to SL-DRB mapping rule;
>>submit the end-marker control PDU to the lower layers.
>store the configured PC5 QoS flow to SL-DRB mapping rule for the PC5 QoS flow.

When RRC releases a PC5 QoS flow to SL-DRB mapping rule for a PC5 QoS flow, the SDAP entity shall:
>remove the PC5 QoS flow to SL-DRB mapping rule for the PC5 QoS flow.

When RRC or SIB indicates that an SL-DRB is released, the SDAP entity shall:
>remove all PC5 QoS flow to SL-DRB mappings associated with the released SL-DRB.

Table 5 shows an example of a SDAP configuration for sidelink communication to which implementations of the present disclosure is applied. The SDAP configuration for sidelink communication may be the information element (IE) SL-SDAP-Config. The IE SL-SDAP-Config is used to set the configurable SDAP parameters for a Sidelink DRB.

TABLE 5

```
-- ASN1START
-- TAG-SL-SDAP-CONFIG-START
SL-SDAP-Config-r16 ::=                         SEQUENCE {
    sl-SDAP-Header-r16                             ENUMERATED {present, absent},
    sl-DefaultRB-r16                               BOOLEAN,
    sl-MappedQoS-Flows-r16                         CHOICE {
        sl-MappedQoS-FlowsList-r16                     SEQUENCE (SIZE
(1..maxNrofSL-QFIs-r16)) OF SL-QoS-Profile-r16,
        sl-MappedQoS-FlowsListDedicated-r16            SL-MappedQoS-
FlowsListDedicated-r16
    }                                              OPTIONAL,  -- Need M
    sl-CastType-r16                                ENUMERATED {broadcast, groupcast,
unicast, spare1}                               OPTIONAL,  -- Need M
    ...
}
SL-MappedQoS-FlowsListDedicated-r16 ::=    SEQUENCE {
    sl-MappedQoS-FlowsToAddList-r16                    SEQUENCE (SIZE
(1..maxNrofSL-QFIs-r16)) OF SL-QoS-FlowIdentity-r16     OPTIONAL,  --
Need N
    sl-MappedQoS-FlowsToReleaseList-16                 SEQUENCE (SIZE
(1..maxNrofSL-QFIs-r16)) OF SL-QoS-FlowIdentity-r16  OPTIONAL  --
Need N
}
-- TAG-SL-SDAP-CONFIG-STOP
-- ASN1STOP
```

In Table 5, the following fields are defined.
sl-DefaultRB indicates whether or not this is the default SLRB for this NR sidelink communication transmission destination. Among all configured instances of SL-SDAP-Config with the same value of sl-DestinationIdentity, this field shall be set to true in at most one instance of SL-SDAP-Config and to false in all other instances.
sl-MappedQoS-Flows indicates QoS flows to be mapped to the SLRB.
sl-MappedQoS-FlowsList indicates the list of SL QoS flows ID of the NR sidelink communication transmission destination mapped to this SLRB.
sl-MappedQoS-FlowsToAddList indicates the list of SL QoS flows ID of the NR sidelink communication transmission destination to be additionally mapped to this SLRB.

sl-MappedQoS-FlowsToReleaseList indicates the list of SL QoS flows ID of the NR sidelink communication transmission destination to be released from existing QoS flow to SLRB mapping of this SLRB.

sl-SDAP-Header indicates whether or not a SDAP header is present on this sidelink DRB. The field cannot be changed after a sidelink DRB is established.

The present disclosure can have various advantageous effects.

For example, a UE can configure a SDAP entity for each destination, in particular when the UE performs sidelink communication with the other UE.

For example, the system can properly control mapping between QoS flows and sidelink radio bearers for a UE performing SL transmission and/or reception based on UE's indication to the network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device operating in a wireless communication system, the method comprising:
    transmitting a sidelink user equipment (UE) information message to a network via a radio resource control (RRC) signaling,
    wherein the sidelink UE information message includes one or more destination identities (IDs) for first destinations of sidelink communication, and
    wherein the sidelink UE information message includes a quality of service (QOS) flow identity (QFI) for each of the destinations;
    receiving an RRC reconfiguration message from the network,
    wherein the RRC reconfiguration message includes a configuration of one or more sidelink radio bearers (SLRBs),
    wherein the configuration of the one or more SLRBs includes a service data adaptation protocol (SDAP) configuration for each of the one or more SLRBs, and
    wherein the SDAP configuration includes a list of QFIs of a corresponding destination, from among one or more second destinations, to be additionally mapped to a corresponding SLRB;
    establishing one or more transmitting SDAP entities for each of the one or more second destinations; and
    mapping, at the one or more transmitting SDAP entities, a QoS flow to the corresponding SLRB.

2. The method of claim 1, wherein the sidelink UE information message includes at least one QoS parameter.

3. The method of claim 2, wherein the at least one QoS parameter includes at least one of a PC5 QoS indicator (PQI), PC5 Flow bit rates, PC5 link aggregated bit rates, communication range and/or default values.

4. The method of claim 1, wherein the wireless device is in communication with at least one of a mobile device, a network, and/or autonomous vehicles other than the wireless device.

5. The method of claim 1, wherein a destination ID of the corresponding destination is not included in the SDAP configuration or in the configuration of the one or more SLRBs.

6. The method of claim 1, wherein the method further comprises:
    transmitting the configuration of the one or more SLRBs to the corresponding destination, and wherein a receiving SDAP entity is established at the corresponding destination based on the SDAP configuration included in the configuration of the one or more SLRBs.

7. A wireless device adapted to operate in a wireless communication system, the wireless device comprising:
    at least one transceiver;
    at least one processor; and
    at least one computer memory operably connectable to the at least one processor and storing instructions that, based on being executed by the at least one processor, perform operations comprising:
    transmitting, using the at least one transceiver, a sidelink user equipment (UE) information message to a network via a radio resource control (RRC) signaling,
    wherein the sidelink UE information message includes one or more destination identities (IDs) for first destinations of sidelink communication, and
    wherein the sidelink UE information message includes a quality of service (QOS) flow identity (QFI) for each of the destinations;
    receiving, using the at least one transceiver, an RRC reconfiguration message from the network,
    wherein the RRC reconfiguration message includes a configuration of one or more sidelink radio bearers (SLRBs),
    wherein the configuration of the one or more SLRBs includes a service data adaptation protocol (SDAP) configuration for each of the one or more SLRBs, and
    wherein the SDAP configuration includes a list of QFIs of a corresponding destination, from among one or more second destinations, to be additionally mapped to a corresponding SLRB;
    establishing one or more transmitting SDAP entities for each of the one or more second destinations; and
    mapping, at the one more transmitting SDAP entities, a QoS flow to the corresponding SLRB.

8. The wireless device of claim 7, wherein the sidelink UE information message includes at least one QoS parameter.

9. The wireless device of claim 8, wherein the at least one QoS parameter includes at least one of a PC5 QoS indicator (PQI), PC5 Flow bit rates, PC5 link aggregated bit rates, communication range and/or default values.

10. The wireless device of claim 7, wherein a destination ID of the corresponding destination is not included in the SDAP configuration or in the configuration of the one or more SLRBs.

11. The wireless device of claim 7, wherein the operations further comprise:

transmitting the configuration of the one or more SLRBs to the corresponding destination, and wherein a receiving SDAP entity is established at the corresponding destination based on the SDAP configuration included in the configuration of the one or more SLRBs.

12. A processing apparatus adapted to control a wireless device in a wireless communication system, the processing apparatus comprising:

at least one processor; and at least one memory operably connectable to the at least one processor, wherein the at least one processor is configured to perform operations comprising:

generating a sidelink user equipment (UE) information message, wherein the sidelink UE information message includes one or more destination identities (IDs) for first destinations of sidelink communication, and wherein the sidelink UE information message includes a quality of service (QOS) flow identity (QFI) for each of the destinations;

obtaining an RRC reconfiguration message, wherein the RRC reconfiguration message includes a configuration of one or more sidelink radio bearers (SLRBs), wherein the configuration of the one or more SLRBs includes a service data adaptation protocol (SDAP) configuration for each of the one or more SLRBs, and wherein the SDAP configuration includes a list of QFIs of a corresponding destination, from among one or more second destinations, to be additionally mapped to a corresponding SLRB;

establishing one or more transmitting entities for each of the one or more second destinations; and mapping, at the one more transmitting SDAP entities, a QoS flow to the corresponding SLRB.

* * * * *